United States Patent [19]

Sato et al.

[11] Patent Number: 5,832,124

[45] Date of Patent: Nov. 3, 1998

[54] PICTURE SIGNAL CODING METHOD AND PICTURE SIGNAL CODING APPARATUS, AND PICTURE SIGNAL DECODING METHOD AND PICTURE SIGNAL DECODING APPARATUS

[75] Inventors: Tomoyuki Sato, Tokyo; Katsumi Tahara, Kanagawa, both of Japan

[73] Assignee: Sony Corporation, Tokyo, Japan

[21] Appl. No.: 341,546

[22] PCT Filed: Mar. 28, 1994

[86] PCT No.: PCT/JP94/00499

§ 371 Date: Feb. 8, 1995

§ 102(e) Date: Feb. 8, 1995

[87] PCT Pub. No.: WO94/23535

PCT Pub. Date: Oct. 13, 1994

[30] Foreign Application Priority Data

Mar. 26, 1993 [JP] Japan .................................... 5-068785

[51] Int. Cl.⁶ ...................................................... G06T 9/00
[52] U.S. Cl. ........................... 382/238; 382/233; 348/409; 348/445
[58] Field of Search ...................................... 382/238, 233, 382/276, 305, 232, 240; 348/390, 403, 410, 409, 556, 445, 415, 416

[56] References Cited

U.S. PATENT DOCUMENTS

| | | | |
|---|---|---|---|
| 5,068,813 | 11/1991 | Thoen | 364/572 |
| 5,184,218 | 2/1993 | Gerdes | 348/390 |
| 5,418,570 | 5/1995 | Ueno et al. | 348/413 |
| 5,420,891 | 5/1995 | Akansu | 348/398 |

FOREIGN PATENT DOCUMENTS

| | | |
|---|---|---|
| 2070827 | 4/1992 | Canada . |
| 0 515 143 A2 | 11/1992 | European Pat. Off. . |
| 0 588 411 A1 | 3/1994 | European Pat. Off. . |
| 0 631 444 A1 | 12/1994 | European Pat. Off. . |
| 2-214389 | 8/1990 | Japan . |
| WO 92/06563 | 4/1992 | WIPO . |

OTHER PUBLICATIONS

Delogne et al., "Compatible Coding of Digital Interlaced HDTV", *IEEE Journal on Selected Areas In Communication*, vol. 11, No. 1, Jan. 1993, U.S., pp. 146–151, XP 000378006.

Kishimoto et al., "A High–definition TV Transmission System using Adaptive Subsampling", *Global Telecommunications Conference*, 1987, vol. 1, Nov. 1987, Tokyo, Japan, pp. 411–415.

Morrison, et al., "COSMIC: A Compatible Scheme for Moving Image Coding", *Signal Processing Image Communication*, vol. 5, No. 1/2, Feb. 1993, Amsterdam, Netherlands, pp. 91–103, XP 000345615.

Unser et al. "B–spline Signal Processing Parts I and II", Feb. 1993, IEEE Transactions on Signal Processing vol. 41, No. 2 pp. 821–848.

*Primary Examiner*—Jon Chang
*Attorney, Agent, or Firm*—Frommer Lawrence & Haug LLP; William S. Frommer

[57] ABSTRACT

Apparatus and method for coding a moving picture signal and decoding a coded moving picture signal. The input picture signal of higher resolution is down-sampled at respective ratios in the longitudinal and lateral directions to generate a picture signal of lower resolution having a different aspect ratio. The coded picture signal of lower resolution is up-sampled at respective ratios in the longitudinal and lateral directions to generate a picture signal of higher resolution having a different aspect ratio.

40 Claims, 32 Drawing Sheets

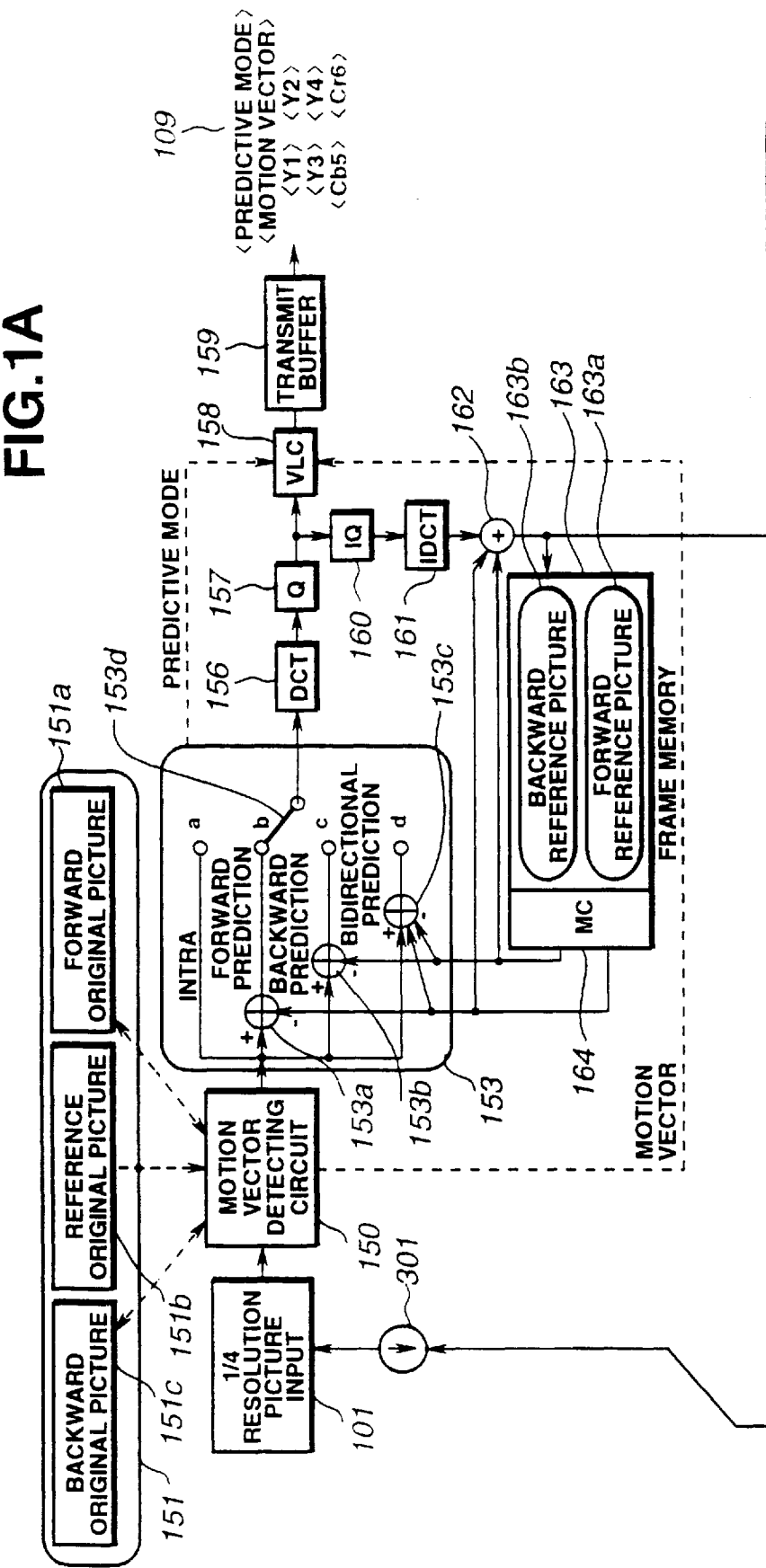

DOWN-SAMPLING CIRCUIT

UP-SAMPLING CIRCUIT

3/8 DOWN-SAMPLING IN LATERAL DIRECTION

1/2 DOWN-SAMPLING IN LONGITUDINAL DIRECTION

○ :INPUT PIXEL

● :THINNED OUTPUT PIXEL

8/3 UP-SAMPLING IN LATERAL DIRECTION

UP-SAMPLING OF 2 TIMES IN LONGITUDINAL DIRECTION

INPUT PIXEL VALUE x
DISTANCE a
DISTANCE b
INPUT PIXEL VALUE y
OUTPUT PIXEL VALUE z=x(b/(a+b))+y(a/(a+b))

OUTPUT PIXEL HAS VALUE OBTAINED BY MULTIPLYING PIXEL VALUES AT TWO ADJACENT POINTS WITHIN THE SAME FIELD BY INVERSE NUMBERS OF RESPECTIVE DISTANCES TO ADD THEM. IN THIS CASE, IF THERE IS POINT CORRESPONDING TO THE SAME POSITION AS OUTPUT PIXEL, VALUE OF OUTPUT PIXEL IS THE SAME VALUE AS INPUT PIXEL.

○ : INPUT PIXEL
● : THINNED OUTPUT PIXEL

FIG.11

7/15 DOWN-SAMPLING IN LONGITUDINAL DIRECTION

3/8 DOWN-SAMPLING IN LONGITUDINAL DIRECTION

8/3 UP-SAMPLING IN LONGITUDINAL DIRECTION

1/3 DOWN-SAMPLING IN LONGITUDINAL DIRECTION

THREE TIMES UP-SAMPLING IN LONGITUDINAL DIRECTION

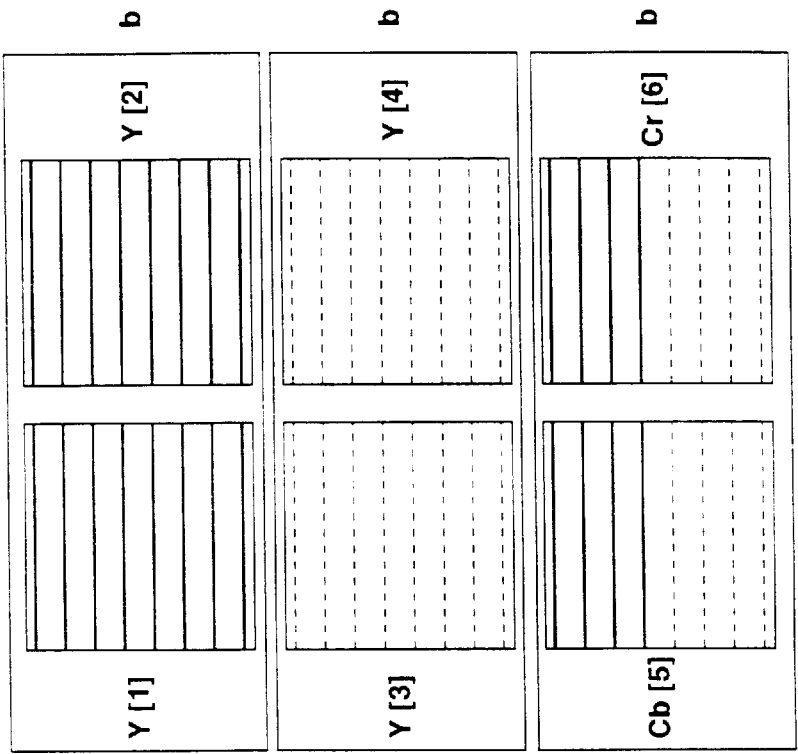
FIG.28A FRAME PREDICTIVE MDOE
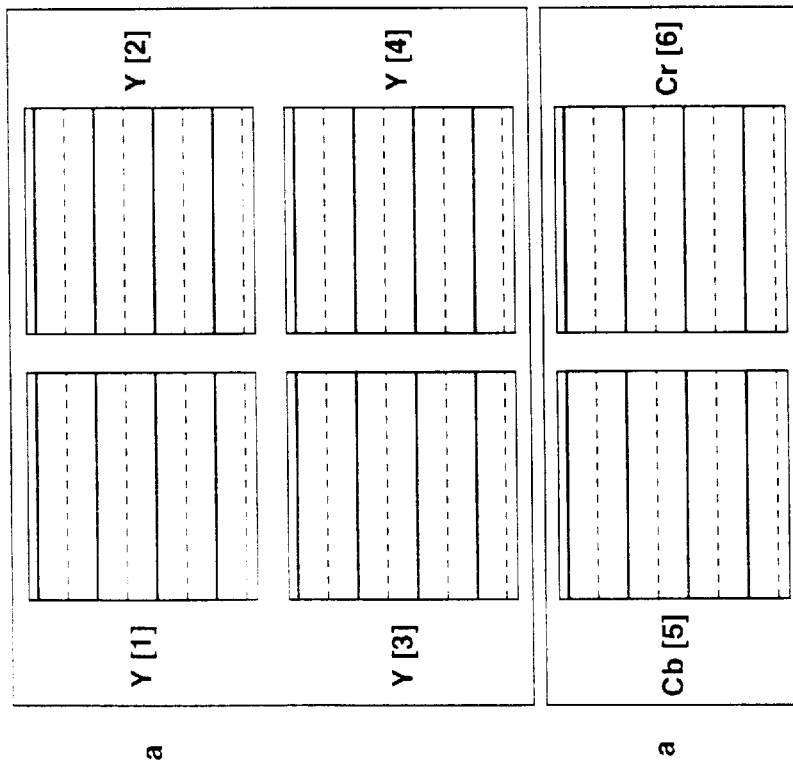
FIG.28B FIELD PREDICTIVE MDOE

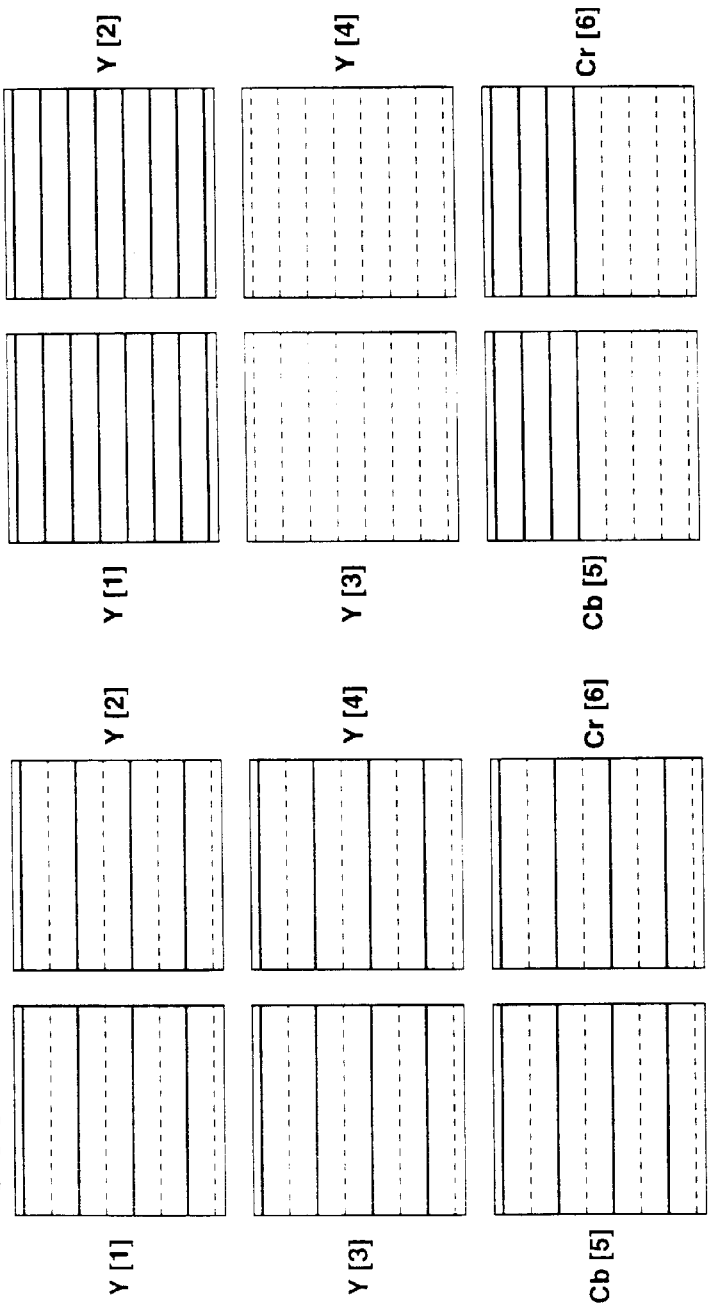

TYPICAL DOWN-SAMPLING

UP-SAMPLING

PICTURE SIGNAL CODING METHOD AND PICTURE SIGNAL CODING APPARATUS, AND PICTURE SIGNAL DECODING METHOD AND PICTURE SIGNAL DECODING APPARATUS

CROSS-REFERENCE TO RELATED APPLICATION

This is a national stage application filed under 35 U.S.C. § 371 of PCT/JP94/00499 filed Mar. 28, 1994.

Picture Signal Coding Method and Picture Signal Coding Apparatus, and Picture Signal Decoding Method and Picture Signal Decoding Apparatus

1. Technical Field

This invention relates to a picture signal coding method and a picture signal coding apparatus, and a picture signal decoding method and a picture signal decoding apparatus suitable when used in the case of recording a moving picture signal onto a recording medium, e.g., a magneto-optical disc or a magnetic tape, etc. to reproduce the recorded moving picture signal to display it on a display, etc., or in the case of transmitting a moving picture signal from the transmitting side to the receiving side through a transmission path to receive it on the receiving side to display it, etc. in television conference systems, television telephone systems, or broadcasting equipments, etc.

2. Background Art

A coding method and a decoding method in which coding in a hierarchical form (hereinafter simply referred to as hierarchical coding) is not applied will be first described, and a coding procedure in the case where hierarchical coding is carried out will be then described.

For example, in systems for transmitting a moving picture signal to remote place, e.g., in television conference system, or television telephone system, etc., a picture signal is coded in a compressed manner by making use of the line correlation or interframe correlation between video signals for the purpose of efficiently utilizing transmission path.

In the case of utilizing the line correlation, a picture signal can be compressed by allowing it to undergo, e.g., DCT (Discrete Cosine Transform) processing, etc.

Moreover, when the interframe correlation is utilized, a picture signal can be coded in a further compressed manner. For example, when frame pictures PC1, PC2, PC3 are assumed to respectively take place at times t=t1, t2, t3 as indicated by A of FIG. 22, a difference between picture signals of frame pictures PC1 and PC2 is calculated to generate picture PC12 as indicated by B of FIG. 22. Moreover, a difference between frame pictures PC2 and PC3 of A of FIG. 22 is calculated to generate picture PC23 of B of FIG. 22. Since pictures of frames adjacent in point of time ordinarily have not so great change, when a difference therebetween is calculated, its difference signal takes a small value. Namely, in picture PC12 designated at B of FIG. 22, a signal of the portion indicated by slanting lines in the figure of picture PC12 of B of FIG. 22 is obtained as a difference between picture signals of frame pictures PC1 and PC2 of A of FIG. 22. In addition, in picture PC23 designated at B of FIG. 22, a signal of the portion indicated by slanting lines in the figure of picture PC23 of B of FIG. 22 is obtained as a difference between picture signals of frame pictures PC2 and PC3 of A of FIG. 22. In view of this, if this difference signal is coded, a quantity of codes can be compressed.

However, even if only the difference signal is transmitted, it is unable to restore original picture. In view of this, pictures of respective frames are caused to be any one of three kinds of pictures of I picture (Intra-coded picture), P picture (Predictive-coded picture) and B picture (Bidirectionally-coded picture), thus to encode a picture signal in a compressed manner.

Namely, as indicated by A and B of FIG. 23, for example, picture signals of frames F1 to F17 are caused to be one unit of processing as group of pictures. Picture signal of the leading frame F1 is coded as I picture. The second frame F2 is processed as B picture, and the third frame F3 is processed as P picture. Then, frames F4 to F17 of the fourth frame and frames subsequent thereto are alternately processed as B picture or P picture.

As a picture signal of I picture, picture signal of that one frame is transmitted as it is. On the contrary, as a picture signal of P picture, fundamentarily, as indicated by A of FIG. 23, a difference from a picture signal of I picture or P picture preceding in point of time to that signal is coded to transmit it. Further, as a picture signal of B picture, fundamentarily, as indicated by B of FIG. 23, a difference from a mean value of both a frame preceding in point of time and a frame succeeding in point of time is determined to encode its difference to transmit it.

A and B of FIG. 24 show the principle of a method of coding a moving picture signal in this way. It is to be noted that data of frame of a moving picture video signal and frame data transmitted are respectively shown, in a model form, in A and B of FIG. 24. As shown in FIG. 24, since the first frame F1 is processed as I picture, i.e., non-interpolated frame, it is transmitted to transmission path as transmit data FiX (transmit non-interpolated frame data) as it is (intra-coding). On the contrary, since the second frame F2 is processed as B picture, i.e., interpolated frame, a difference from a mean values of frame F1 preceding in point of time and frame F3 succeeding in point of time (non-interpolated frame of interframe coding) is calculated. Thus, its difference is transmitted as transmit data (transmit interpolated frame data) F2X.

The processing as B picture will now be described in more detail. There exist four kinds of modes switchable in macro block units. The first processing is processing for transmitting data of original frame F2 as transmit data F2X as it is as indicated by arrow SP1 of broken lines in the figure (intra-coding mode). This first processing is processing similar to that in the case of I picture. The second processing is processing for calculating a difference from frame F3 backward in point of time to transmit that difference as indicated by arrow SP2 of broken lines in the figure (backward predictive mode). The third processing is processing for transmitting difference from frame F1 preceding in point of time as indicated by arrow SP3 of broken lines in the figure (forward predictive mode). In addition, the fourth processing is processing for generating a difference from a mean value of frame F1 preceding in point of time and frame F3 succeeding in point of time as indicated by arrow SP4 of broken lines in the figure to transmit it as transmit data F2X (bidirectionally predictive mode).

A method in which a quantity of transmit data is minimum of these four methods is employed in macro block units.

It is to be noted that, at the time of transmitting difference data, motion vector x1 from picture (predictive picture) of frame subject to calculation of difference (motion vector between frames F1 and F2 in the case of forward prediction), motion vector x2 therefrom (motion vector between frames F3 and F2 in the case of backward prediction), or both motion vectors x1 and x2 (in the case of bidirectional prediction) is or are transmitted along with difference data.

Moreover, with respect to frame F3 of P picture (non-interpolated frame of interframe coding), by using frame F1 preceding in point of time as predictive picture, a difference signal (indicated by arrow SP3 of broken lines) between the frame F3 and the frame F1 and motion vector x3 are calculated. They are transmitted as transmit data F3X (forward predictive mode). Alternatively, data of original frame F3 is transmitted (indicated by arrow SP1 of broken lines) as transmit data F3X as it is (intra-coding mode). In this P picture, how an optimum one of data transmitting methods is selected is similarly to that in the case of B picture. A method in which a quantity of transmit data is minimum is selected in macro block units.

It is to be noted that frame F4 of B picture and frame F5 of P picture are processed similarly to the above, whereby transmit data F4X, F5X, motion vectors x4, x5, x6, etc. are obtained.

FIG. 25 shows an example of the configuration of an apparatus for coding a moving picture signal on the basis of the above-described principle to transmit a coded signal to decode it. Coding unit 1 encodes an inputted video signal to transmit a coded signal to recording medium 3 as transmission path to record it thereonto. On the other hand, decoding unit 2 reproduces the signal recorded on recording medium 3 to reproduce it to decode the reproduced signal to output decoded signal.

Initially, in the coding unit 1, video signal VD inputted through input terminal 10 is inputted to pre-processing circuit 11, at which it is separated into luminance signal (component) and color signal (component) (color difference signal in the case of this example). They are caused to undergo A/D conversion at A/D converters 12, 13, respectively. Video signals caused to be digital signals after undergone A/D conversion by A/D converters 12, 13 are delivered to frame memory 14, at which they are stored. At this frame memory 14, luminance signal is stored into luminance signal frame memory 15, and color difference signal is stored into color difference signal frame memory 16.

Format converting circuit 17 converts a signal of frame format stored in frame memory 14 into a signal of block format. Namely, as indicated by (A) of FIG. 26, video signal stored in the frame memory 14 is caused to be data of frame format in which V lines of H dots per each line are gathered. Format converting circuit 17 divides this signal of one frame into N slices with 16 lines being as a unit. Then, respective slices are divided into M macro blocks as indicated by (B) of FIG. 26. Each macro block is constituted by luminance signals corresponding to pixels (dots) of 16×16 as indicated by (C) of FIG. 26. Each luminance signal is further divided into blocks Y [1] to Y [4] with 8×8 dots being as a unit as indicated by (C) of FIG. 26. In addition, Cb signal of 8×8 dots and Cr signal of 8×8 dots are caused to correspond to luminance signal of 16×16 dots.

As stated above, data converted into block format is delivered from format converting circuit 17 to encoder 18, at which it is encoded. The detail of encoding will be described later with reference to FIG. 27.

A signal encoded by encoder 18 is outputted to transmission path as bit stream, and is recorded onto, e.g., recording medium 3.

Data reproduced from recording medium 3 is delivered to decoder 31 of decoding unit 2, at which it is decoded. The detail of decoder 31 will be described later with reference to FIG. 30.

Data decoded by decoder 31 is inputted to format converting circuit 32, at which conversion from block format to frame format is carried out. Luminance signal of frame format is delivered to luminance signal frame memory 34 of frame memory 33, and is stored thereinto. Color difference signal is delivered to color difference signal frame memory 35, and is stored thereinto. Luminance signal and color signal which have been read out from luminance signal frame memory 34 and color difference signal frame memory 35 are caused to respectively undergo D/A conversion by D/A converters 36 and 37. The signals thus obtained are delivered to post-processing circuit 38, at which they are synthesized. This output video signal is outputted from output terminal 30 to display, e.g., CRT, etc. (not shown) to display it thereon.

An example of the configuration of encoder 18 will now be described with reference to FIG. 27.

Picture data to be coded which has been delivered through input terminal 49 is inputted to motion vector detecting circuit 50 in macro block units. The motion vector detecting circuit 50 processes picture data of respective frames as I picture, P picture or B picture in accordance with a predetermined sequence set in advance. Picture types (pictures of I, P, B) for processing pictures of respective frames sequentially inputted are determined in advance. As shown in FIG. 23, for example, group of pictures consisting of frames F1 to F17 are processed as I, B, P, B, P, . . . B, P.

Picture data of frame (e.g., frame F1) processed as I picture is transferred from motion vector detecting circuit 50 to forward original picture section 51a of frame memory 51, and is stored thereinto. Moreover, picture data of frame (e.g., frame F2) processed as B picture is transferred to original picture section (reference original picture section) 51b, and is stored thereinto. In addition, picture data of frame (e.g., frame F3) processed as P picture is transferred to backward original picture section 51c, and is stored thereinto.

At the subsequent timing, when picture of frame to be processed as B picture (e.g., the frame F4) or P picture (the frame F5) is further inputted, picture data of the first P picture (frame F3) which has been stored in backward original picture section 51c up to that time is transferred to forward original picture section 51a, picture data of the subsequent B picture (frame F4) is stored (overwritten) into original picture section 51b, and picture data of the subsequent P picture (frame F5) is stored (overwritten) into backward original picture section 51c. Such operation will be sequentially repeated.

Signals of respective pictures stored in frame memory 51 are read out therefrom. At predictive mode switching circuit 52, frame predictive mode processing or field predictive mode processing is carried out. Further, under control of predictive judging circuit 54, at operation section 53, operation by intra-coding mode, forward predictive mode, backward predictive mode or bidirectionally predictive mode is carried out. Which any one of these processing is carried out is determined in macro block units in correspondence with predictive error signal (difference between reference picture to be processed and predictive picture corresponding thereto). For this reason, motion vector detecting circuit 50 generates, in macro block units, absolute value sum (or square sum) of predictive error signals used for this judgment and evaluation values of intra-coding mode corresponding to those predictive error signals.

Frame predictive mode and field predictive mode in predictive mode switching circuit 52 will now be described.

In the case where frame predictive mode is set, predictive mode switching circuit 52 outputs four luminance blocks Y [1] to Y [4] delivered from motion vector detecting circuit 50 to operation section 53 of the succeeding stage as they are. Namely, in this case, as indicated by A of FIG. 28, there results the state where data of lines of odd field and data of lines of even field are mixed in respective luminance blocks. It is to be noted that solid lines in respective macro blocks of FIG. 28 indicate data of lines of odd field (lines of the first field), and broken lines indicate data of lines of even field (lines of the second field), and a and b of FIG. 28 indicate unit of motion compensation. In this frame predictive mode, prediction is carried out with four luminance blocks (macro blocks) being as a unit, and one motion vector is caused to correspond to four luminance blocks.

On the contrary, predictive mode switching circuit 52 is operative as follows. Namely, in the case where field prediction mode is set, the predictive mode switching circuit 52 carries out such a processing to allow a signal of a structure indicated by A of FIG. 28 inputted from motion vector detecting circuit 50 to be a signal of a structure indicated by B of FIG. 28 such that luminance blocks Y [1] and Y [2] of four luminance blocks are constituted by only dots of lines of odd field, for example, and the remaining two luminance blocks Y [3] and Y [4] are constituted by data of lines of even field to output the signal thus constituted to operation section 53. In this case, one motion vector is caused to correspond to two luminance blocks Y [1] and Y [2], and the other one motion vector is caused to correspond to the remaining two luminance blocks Y [3] and Y [4].

It is to be noted that, in the case of frame predictive mode, color difference signal is delivered to operation section 53 in the state where data of lines of odd field and data of lines of even field are mixed as indicated by A of FIG. 28. On the other hand, in the case of field prediction mode, the upper half portions (four lines) of respective color difference blocks Cb, Cr are caused to be color difference signals of odd field corresponding to luminance blocks Y [1], Y [2], and the lower half portions (four lines) are caused to be color difference signals of even field corresponding to luminance blocks Y [3], Y [4].

Moreover, motion vector detecting circuit 50 operates as follows. Namely, this circuit 50 generates, in macro block units, evaluation values of intra coding mode for determining whether predictive mode where prediction is carried out is intra-coding mode, forward predictive mode, backward predictive mode or bidirectionally predictive mode, and whether predictive mode where processing is carried out is frame predictive mode or field predictive mode, and absolute value sum of respective predictive errors with respect to respective macro blocks in predictive judgment circuit 54.

Namely, as evaluation value of intra coding mode, absolute value sum Σ|Aij-(mean value of Aij)| of differences between signals Aij of macro block of reference picture which is to be coded from now and its mean value is determined. Further, as absolute value sum of predictive error of forward prediction, sum Σ|Aij-Bij| of absolute values |Aij-Bij| of differences (Aij-Bij) between signals Aij of macro block of reference picture and signals Bij of macro block of predictive picture in the respective frame and field predictive modes is determined. In addition, absolute value sums of predictive errors of backward prediction and bidirectional prediction are determined respectively in the cases of frame and field predictive modes similarly to the case of the forward prediction (its predictive picture is changed to predictive picture different from the case of the forward prediction).

These absolute value sums are delivered to predictive judging circuit 54. The predictive judging circuit 54 selects, as absolute value sum of predictive errors of inter prediction, the minimum one of absolute value sums of predictive errors of the forward prediction, the backward prediction and the bidirectional prediction in the respective frame and field predictive modes. Further, absolute value sum of predictive errors of inter prediction and evaluation value of intra coding mode are compared with each other to select a smaller one to select mode corresponding to the selected value as predictive mode and frame/field predictive mode. Namely, if evaluation value of intra coding mode is smaller than the absolute value sum of predictive errors of inter prediction, the intra coding mode is set. In contrast, if absolute value sum of predictive errors of inter prediction is smaller than evaluation value of intra coding mode, mode where corresponding absolute value sum is the minimum of the forward predictive mode, the backward predictive mode, and the bidirectionally predictive mode is set as predictive mode and frame/field predictive mode.

As described above, predictive mode switching circuit 52 delivers, to operation section 53, a signal of macro block of reference picture of a structure as shown in FIG. 28 corresponding to mode selected by predictive (mode) judging circuit 54 of frame predictive mode and field predictive mode. Moreover, motion vector detecting circuit 50 outputs a motion vector between a predictive picture and a reference picture corresponding to predictive mode selected by predictive judging circuit 54 to deliver it to variable length coding circuit 58 and motion compensating circuit 64 which will be described later. It is to be noted that, as motion vector, motion vector in which absolute value sum of corresponding predictive error is minimum is selected.

Predictive judging circuit 54 sets, as predictive mode, intra coding mode (mode without carrying out motion compensation) when motion vector detecting circuit 50 is reading out picture data of I picture from forward original picture section 51a to switch 53d of operation section 53 to contact a side. Thus, picture data of I picture is inputted to DCT mode switching circuit 55.

As indicated by A or B of FIG. 29, this DCT mode switching circuit 55 allows data of four luminance blocks to be either in the state where lines of odd field and lines of even field are mixed (frame DCT mode) or in the state where lines of odd field and lines of even field are separated (field DCT mode) to output it to DCT circuit 56.

Namely, DCT mode switching circuit 55 compares coding efficiency in the case where DCT processing is carried out with data of odd field and even field being mixed and coding efficiency in the case where DCT processing is carried out with such data being separated to select mode of higher coding efficiency.

For example, as indicated by A of FIG. 29, an inputted signal is caused to be of a structure in which lines of odd field and even field are mixed to calculate differences between signals of lines of odd field and signals of lines of even field which are adjacent in upper and lower directions to further determine sum of their absolute values (or square sum). Moreover, as indicated by B of FIG. 29, an inputted signal is caused to be of a structure in which lines of odd field and even field are separated to calculate differences between signals of lines of odd field and differences between signals of lines of even field which are adjacent to each other in upper and lower directions to determine sums of respective absolute values (or square sums). Further, both values (absolute sums) are compared with each other to set DCT mode corresponding to a smaller value. Namely, if the former is smaller, frame DCT mode is set. In contrast, if the latter is smaller, field DCT mode is set.

The DCT mode switching circuit 55 outputs data of a structure corresponding to the selected DCT mode to DCT circuit 56, and outputs DCT flag indicating the selected DCT mode to variable length coding circuit 58.

As apparent from comparison between frame/field predictive mode (see FIG. 28) in the predictive mode switching circuit 52 and DCT mode (see FIG. 29) in the DCT mode switching circuit 55, data structures in respective modes of the both are substantially the same with respect to luminance blocks.

In the case where frame predictive mode (mode in which odd lines and even lines are mixed) is selected in the predictive mode switching circuit 52, there is high possibility that frame DCT mode (mode in which odd lines and even lines are mixed) may be selected also in the DCT mode switching circuit 55. Moreover, in the case where field predictive mode (mode where data of odd and even fields are separated) is selected in the predictive mode switching circuit 52, there is high possibility that field DCT mode (mode where data of odd and even fields are separated) may be selected in the DCT mode switching circuit 55.

However, such a selection is not necessarily carried out at all times. In the predictive mode switching circuit 52, mode is determined so that absolute value sum of predictive errors becomes small. In the DCT mode switching circuit 55, mode is determined so that coding efficiency becomes satisfactory.

Picture data of I picture outputted from DCT mode switching circuit 55 is inputted to DCT circuit 56, at which such data is caused to undergo DCT (Discrete Cosine Transform) processing so that it is transformed into DCT coefficients. These DCT coefficients are inputted to quantizing circuit 57, at which they are quantized at quantization step corresponding to data storage quantity (buffer storage quantity) of transmit buffer 59. Then, quantized data thus obtained is inputted to variable length coding circuit 58.

Variable length coding circuit 58 converts picture data (data of I picture in this case) delivered from quantizing circuit 57 into variable length code, e.g., Huffman code, etc. in correspondence with quantization step (scale) delivered from quantizing circuit 57 to output it to transmit buffer 59.

Variable length coding circuit 58 is supplied with quantization step (scale) from quantizing circuit 57, predictive mode (mode indicating any one of which intra-coding mode, forward predictive mode, backward predictive mode or bidirectionally predictive mode is set) from predictive judging circuit 54, motion vector from motion vector detecting circuit 50, predictive flag (flag indicating which any one of frame predictive mode and field predictive mode is set) from predictive judging circuit 54, DCT flag (flag indicating which any one of frame DCT mode and field DCT mode is set) outputted from DCT mode switching circuit 55. These information are also caused to undergo valiable length coding.

Transmit buffer 59 temporarily stores data inputted thereto to output data corresponding to a quantity of storage to quantizing circuit 57.

The transmit buffer 59 is operative so that when the remaining data quantity increases up to allowed upper limit, it allows quantization scale of quantizing circuit 57 to be great by quantization control signal to thereby lower data quantity of quantized data. In contrast, when the remaining data quantity decreases down to allowed lower limit, transmit buffer 59 allows quantization scale of quantizing circuit 57 to be small by quantization control signal to thereby increase data quantity of quantized data. In this way, overflow or underflow of transmit buffer 59 is prevented.

Data stored in the transmit buffer 59 is read out at a predetermined timing, and is outputted to transmission path through output terminal 69. The data thus outputted is recorded onto, e.g., recording medium 3.

On the other hand, data of I picture outputted from quantizing circuit 57 is inputted to inverse quantizing circuit 60, and is inverse-quantized in correspondence with quantization step delivered from quantizing circuit 57. An output of the inverse-quantizing circuit 60 is inputted to IDCT (Inverse DCT) circuit 61, at which it is inverse-DCT processed. Then, the output thus processed is delivered to forward predictive picture section 63a of frame memory 63 through operation element 62, and is stored thereinto.

Meanwhile, motion vector detecting circuit 50 is operative so that in the case of respectively processing picture data of respective frames sequentially inputted as pictures of I, B, P, B, P, B . . . as previously described, for example, after picture data of frame initially inputted is processed as I picture, prior to processing, as B picture, picture data of frame subsequently inputted, picture data of frame further subsequently inputted is processed as P picture. This is because since there is the possibility that B picture may be caused to undergo backward prediction and bidirectional prediction, unless P picture as backward predictive picture is prepared in advance, it is unable to decode it.

In view of this, motion vector detecting circuit 50 initiates processing of picture data of P picture stored in backward original picture section 51c subsequently to processing of I picture. Similarly to the above-described case, evaluation value of intra coding mode and absolute value sum of interframe differences (predictive errors) in macro block units are delivered from motion vector detecting circuit 50 to predictive judging circuit 54. The predictive judging circuit 54 sets, in macro block units, any one of frame predictive mode and field predictive mode and any one of intra-coding mode and forward predictive mode in correspondence with evaluation values of intra coding mode and absolute value sum of predictive errors of macro block of the P picture.

Operation section 53 switches switch 53d to contact a side as described above when intra-coding mode is set. Accordingly, this data is transmitted to transmission path through DCT mode switching circuit 55, DCT circuit 56, quantizing circuit 57, variable length coding circuit 58, and transmit buffer 59 similarly to data of I picture. In addition, this data is delivered to backward predictive picture section 63b of frame memory 63 through inverse quantizing circuit 60, IDCT circuit 61, and operation element 62, and is stored thereinto.

On the other hand, at the time of forward prediction mode, switch 53d is switched to contact b, and picture (picture of I picture in this case) data stored in forward predictive picture section 63a of frame memory 63 is read out. The data thus read out is motion-compensated in correspondence with motion vector outputted from motion vector detecting circuit 50 by motion compensating circuit 64. Namely, motion compensating circuit 64 is operative so that when setting of forward predictive mode is instructed from predictive judging circuit 54, it reads out data with readout address of forward predictive picture section 63a being shifted by distance corresponding to motion vector from the position corresponding to the position of macro block that motion vector detecting circuit 50 is outputting, thus to generate predictive picture data.

Predictive picture data outputted from motion compensating circuit 64 is delivered to operation element 53a. The operation element 53a subtracts, from data of macro block of reference picture delivered from predictive mode switching circuit 52, predictive picture data corresponding to this macro block which has been delivered from motion compensating circuit 64 to output its difference (predictive error). This difference data is transmitted to transmission path through DCT mode switching circuit 55, DCT circuit 56, quantizing circuit 57, variable length coding circuit 58, and transmit buffer 59. In addition, this difference data is locally decoded by inverse quantizing circuit 60, IDCT circuit 61. The decoded data thus obtained is inputted to operation element 62.

This operation element 62 is supplied with the same data as predictive picture data delivered to operation element 53a. The operation element 62 adds predictive picture data outputted from motion compensating circuit 64 to difference data outputted from IDCT circuit 61. Thus, picture data of original (decoded) P picture is obtained. The picture data of this P picture is delivered to backward predictive picture section 63b of frame memory 63, and is stored thereinto. It should be noted that since it is necessary from a practical point of view that data structure of difference data outputted from IDCT circuit and data structure of predictive picture data which are delivered to operation element 62 are the same, a circuit for carrying out sequencing of data is required in preparation for the case where frame/field predictive mode and frame/field DCT mode are different, but indication of such a circuit is omitted for brevity.

Motion vector detecting circuit 50 then executes processing of B picture after data of I picture and P picture are respectively stored into forward predictive picture section 63a and backward predictive picture section 63b in a manner stated above. Predictive judging circuit 54 sets frame/field predictive mode in correspondence with evaluation value of intra-coding mode and magnitude of absolute value sum of interframe differences, and sets predictive mode to any one of intra-coding mode, forward predictive mode, backward predictive mode, and bidirectionally predictive mode.

As described above, when predictive coding mode is intra-coding mode or forward predictive mode, switch 53d is switched to contact a or contact b. At this time, processing similar to the case of p picture is carried out. Thus, data is transmitted.

On the contrary, when forward predictive mode or bidirectionally predictive mode is set, switch 53d is switched to either contact c or contact d.

When predictive coding mode is backward predictive mode where switch 53d is switched to contact c, picture (picture of P picture in this case) data which is stored in backward predictive picture section 63b is read out. The data thus read out is motion-compensated in correspondence with motion vector outputted from motion vector detecting circuit 50 by motion compensating circuit 64. Namely, motion compensating circuit 64 is operative so that when setting of backward predictive mode is instructed from predictive judging circuit 54, it reads out data with readout address of backward predictive picture section 63b being shifted by distance corresponding to motion vector from position corresponding to position of macro block that motion vector detecting circuit 50 is now outputting to generate predictive picture data.

Predictive-picture data outputted from motion compensating circuit 64 is delivered to operation element 53b. The operation element 53b subtracts, from data of macro block of reference picture delivered from predictive mode switching circuit 52, predictive picture data delivered from motion compensating circuit 64 to output difference thereof. This difference data is transmitted to transmission path through DCT mode switching circuit 55, DCT circuit 56, quantizing circuit 57, variable length coding circuit 58, and transmit buffer 59.

When predictive coding mode is bidirectionally predictive mode where switch 53d is switched to contact d, picture (picture of I picture in this case) data stored in forward predictive picture section 63a and picture (picture of P picture in this case) data stored in backward predictive picture section 63b are read out. These data thus read out are motion-compensated in correspondence with motion vector outputted from motion vector detecting circuit 50 by motion compensating circuit 64. Namely, motion compensating circuit 64 is operative so that when setting of bidirectionally predictive mode is instructed from predictive judging circuit 54, it reads out data with readout addresses of forward predictive picture section 63a and backward predictive picture section 63b being shifted by distances corresponding to motion vectors (at this time, two motion vectors for forward predictive picture and for backward predictive picture in the case of frame predictive mode; and four motion vectors in total of two motion vectors for forward predictive picture and two motion vectors for backward predictive picture) from position corresponding to position of macro block that motion vector detecting circuit 50 is now outputting, thus to generate predictive picture data.

Predictive picture data outputted from motion compensating circuit 64 is delivered to operation element 53c. The operation element 53c subtracts, from data of macro block of reference picture delivered from motion vector detecting circuit 50, mean value of predictive picture data delivered from motion compensating circuit 64 to output its difference. This difference data is transmitted to transmission path through DCT mode switching circuit 55, DCT circuit 56, quantizing circuit 57, variable length coding circuit 58, and transmit buffer 59.

Since there is no possibility that picture of B picture is not used as predictive picture of other pictures, this picture is not stored into frame memory 63.

It is to be noted that, in frame memory 63, forward predictive picture section 63a and backward predictive picture section 63b are caused to undergo bank switching as occasion demands, thus making it possible to output, in a switched manner, forward predictive picture or backward predictive picture stored in one or the other picture section with respect to a predetermined reference picture.

While luminance blocks have been mainly described, color difference blocks are similarly processed with macro block shown in FIGS. 28 and 29 being as a unit, and is transmitted. It is to be noted that, as motion vectors in the case of processing color difference blocks, motion vectors obtained by allowing motion vectors of corresponding luminance blocks to be respectively one half in vertical and horizontal directions may be used.

FIG. 30 is a block diagram showing the configuration of an example of decoder 31 of FIG. 25. Coded picture data transmitted through transmission path (recording medium 3) is received by receiving circuit (not shown), or is reproduced by reproducing unit. The data thus obtained is temporarily stored into receiving buffer 81 through input terminal 80. Thereafter, such data is delivered to variable length decoding circuit 82 of decoding circuit 90. The variable length decoding circuit 82 allows data delivered from receiving buffer 81 to undergo variable length decoding to output motion vector, predictive mode, predictive flag and DCT flag to motion compensating circuit 87 and to output quantization step to inverse quantizing circuit 83, and to output decoded picture data to inverse quantizing circuit 83.

The inverse quantizing circuit 83 inverse-quantizes picture data which has been delivered from variable length decoding circuit 82 in accordance with quantization step which has been similarly delivered from variable length decoding circuit 82 to output inverse-quantized data to IDCT circuit 84. Data (DCT coefficients) outputted from inverse-quantizing circuit 83 is caused to undergo inverse-DCT processing at IDCT circuit 84. The data thus processed is delivered to operation element 85.

In the case where picture data delivered from IDCT circuit 84 is data of I picture, that data is outputted from operation element 85. This output data is delivered to forward predictive picture section 86a of frame memory 86 in order to generate predictive picture data of picture data (data of P or B picture) inputted later to operation element 85, and is stored thereinto. In addition, this data is outputted to format converting circuit 32 (FIG. 25).

In the case where picture data delivered from IDCT circuit 84 is data of P picture in which picture data earlier by one frame is caused to be predictive picture data, and is data of macro block coded in forward predictive mode, picture data (data of I picture) earlier by one frame, which is stored in forward predictive picture section 86a of frame memory 86, is read out, and motion compensation corresponding to motion vector outputted from variable length decoding circuit 82 is implemented to the data thus read out at motion compensating circuit 87. At operation element 85, this motion-compensated data is added to picture data (data of difference) delivered from IDCT circuit 84. The added data thus obtained is outputted. This added data, i.e., decoded data of P picture is delivered to backward predictive picture section 86b of frame memory 86 in order to generate predictive picture data of picture data (data of B picture or P picture) inputted later to operation element 85, and is stored thereinto.

Even if corresponding data is data of P picture, data of macro block coded in the intra-coding mode is not particularly processed at operation element 85 similarly to data of I picture, and is stored into backward predictive picture section 86b as it is.

Since this P picture is picture to be displayed subsequently to B picture, it is not yet outputted to format converting circuit 32 at this time point (As described above, P picture which has been inputted subsequently to B picture is processed prior to B picture, and is transmitted).

In the case where picture data delivered from IDCT circuit 84 is data of B picture, picture data of I picture (in the case of forward predictive mode) stored in forward predictive picture section 86a of frame memory 86, picture data of P picture (in the case of backward predictive mode) stored in backward predictive picture section 86b, or both picture data (in the case of bidirectionally predictive mode) is or are read out in correspondence with predictive mode delivered from variable length decoding circuit 82. At motion compensating circuit 87, motion compensation corresponding to motion vector outputted from variable length decoding circuit 82 is implemented to the above-mentioned picture data which has been read out. Thus, predictive picture is generated. It is to be noted that in the case where no motion compensation is required (in the case of intra-coding mode), no predictive picture is generated.

Data to which motion compensation has been implemented at motion compensating circuit 87 in this way is added to an output of IDCT circuit 84 at operation element 85. This added output is outputted to format converting circuit 32 through output terminal 91.

It is to be noted that since this added output is data of B picture and is not utilized for generating predictive picture of other pictures, it is not stored into frame memory 86.

After picture of B picture is outputted, picture data of P picture stored in backward predictive picture section 86b is read out, and is outputted as reproduction picture through motion compensating circuit 87 and operation element 85. It is to be noted that motion compensation and addition are not carried out at this time.

It is to be noted that while, in this decoder 31, circuits corresponding to predictive mode switching circuit 52 and DCT mode switching circuit 55 in encoder 18 of FIG. 27 are not illustrated, motion compensating circuit 87 executes processing corresponding to these circuits, i.e., processing for allowing the configuration in which signals of lines of odd field and even field are separated to be original configuration in which they are mixed for a second time as occasion demands.

While processing of luminance signal has been described above, processing of color difference signal is similarly carried out. It is to be noted that motion vector obtained by allowing motion vector for luminance signal to be one half in vertical and horizontal directions may be used.

While explanation has been made in connection with the example of coding and decoding to which hierarchical coding is applied, it is known that hierarchical coding is carried out to thereby transmit picture of higher resolution and picture of lower resolution. In this case, e.g., input picture of higher resolution is caused to undergo down-sampling by a circuit as shown in FIG. 31. Namely, signal of input picture of higher resolution is inputted to low-pass filter 91, at which unnecessary higher frequency component is eliminated. The signal limited to a predetermined frequency band by low-pass filter 91 is inputted to thinning circuit 92, at which pixels are thinned at a rate of one to two. Thus, signal of resolution of ¼ is obtained.

The picture signal of resolution of ¼ is encoded as described above and is transmitted. On the other hand, picture signal of higher resolution is also encoded, and is transmitted along with picture signal of resolution of ¼. In coding the picture signal of higher resolution, a predictive picture signal of a picture signal of higher resolution is generated from a signal obtained by decoding a coded signal of a picture signal of picture signal of resolution of ¼. For the purpose of generating this predictive picture signal, e.g., interpolating circuit 95 as shown in FIG. 32 is employed.

A signal obtained by decoding a coded signal of a picture signal of resolution of ¼ is inputted to this interpolating circuit 95. This interpolating circuit 95 interpolates this signal as shown in FIG. 33 (carries out up-sampling).

Namely, luminance data of line where no luminance data exists is generated by allowing values of luminance data positioned at upper and lower lines to be respectively one half to add (average) them. Since frequency band limitation is carried out when down-sampling is carried out by down-sampling circuit shown in FIG. 31, space frequency is not extended by this up-sampling, but resolution can be doubled.

Picture signal of higher resolution is encoded on the basis of predictive picture signal generated in this way and is transmitted.

On the decoder side, picture signal of resolution of ¼ is decoded in a manner similar to the above-described case.

Moreover, at the time of decoding picture signal of resolution of ¼, a predictive picture signal of a picture signal of higher resolution is generated. Then, the predictive picture signal thus generated is used to decode picture signal of higher resolution. Also in the case of generating predictive picture signal on the decoder side, an interpolating circuit as shown in FIG. 32 is used.

As stated above, in the conventional picture signal coding method and decoding method, in the case of carrying out hierarchical coding/decoding, a picture signal of higher resolution is caused to undergo down-sampling at a rate of 2:1 to generate a picture signal of lower resolution. As a result, when high definition television signal represented by, e.g., high vision is employed as picture signal of high resolution, in the case of coding picture signal of low resolution obtained by allowing such picture signal of higher resolution to undergo down-sampling at a rate of 2:1 to transmit it, its aspect ratio remains to be 16:9. Accordingly, in television image receiver of the NTSC system having aspect ratio of 4:3, it was disadvantageously unable to monitor picture signal of resolution of ¼.

DISCLOSURE OF THE INVENTION

This invention has been made in view of such circumstances, and contemplates permitting picture signal of lower resolution obtained by allowing picture signal of higher resolution having aspect ratio of 16:9 to undergo down-sampling to be monitored on conventional image receiver of the NTSC system, for example.

A picture signal coding method according to this invention is directed to a picture signal coding method comprising the steps of decomposing a picture signal into a picture signal of lower resolution and a picture signal of higher resolution, generating a predictive picture signal of a picture signal of higher resolution from a signal obtained by decoding a coded signal of a picture signal of lower resolution, and encoding a picture signal of higher resolution by using the generated predictive picture signal, characterized in that the method comprises the steps of implementing thinning to a picture signal of higher resolution by using spatial filtering at a predetermined resolution so as to have an aspect ratio between the numbers of pixels in longitudinal and lateral directions different from each other to generate a picture signal of lower resolution; implementing a predetermined processing to a signal obtained by decoding a coded signal of a picture signal of lower resolution by using spatial filtering at a predetermined resolution so as to have the original aspect ratio to generate a predictive picture signal of a picture signal of higher resolution; and encoding the picture signal of higher resolution by using the generated predictive picture signal.

The numbers of pixels in longitudinal and lateral directions of a picture signal of higher resolution are caused to be respectively ½ times and ⅜ times, thereby making it possible to convert the higher resolution picture signal into a picture signal of lower resolution of the squeeze system. At this time, the numbers of pixels in longitudinal and lateral directions of a signal obtained by decoding a coded signal of a picture signal of lower resolution are caused to be respectively 2 times and ⅝ times, thus making it possible to generate a predictive picture signal of higher resolution. This method can be applied to, e.g., a picture signal of higher resolution in which the number of pixels in lateral direction is 1920 and the number of pixels in longitudinal direction is 960, or a picture signal of higher resolution in which the number of pixels in lateral direction is 1920, and the number of pixels in longitudinal direction is 1152.

Moreover, the numbers of pixels in longitudinal and lateral directions of a picture signal of higher resolution are permitted to be respectively 7/15 times and ⅜ times. This method can be applied to a picture signal of higher resolution in which the number of pixels in lateral direction is 1920 and the number of pixels in longitudinal direction is 1024.

Another picture signal coding method according to this invention is directed to a picture signal coding method comprising the steps of decomposing a picture signal into a picture signal of lower resolution and a picture signal of higher resolution, generating a predictive picture signal of the picture signal of higher resolution from a signal obtained by decoding a signal of a coded signal of the picture signal of lower resolution, and encoding the picture signal of higher resolution by using the generated predictive picture signal, characterized in that the method comprises the steps of implementing thinning processing to a picture signal of higher resolution by using spatial filtering at a resolution of ⅜ times in longitudinal direction and ⅜ times in lateral direction to generate a picture signal of lower resolution of the letter box system; implementing a predetermined processing to a signal obtained by decoding a coded-signal of the picture signal of lower resolution by using spatial filtering at a resolution of ⅝ times in longitudinal direction and ⅝ times in lateral direction to generate a predictive picture signal of the picture signal of higher resolution; and encoding the picture signal of higher resolution by using the generated predictive picture signal.

This method can be applied to a picture signal of higher resolution in which the number of pixels in lateral direction is 1920 and the number of pixels in longitudinal direction is 960, or a picture signal in which the number of pixels in lateral direction is 1920 and the number of pixels in longitudinal direction is 1152.

Moreover, there may be employed a method comprising the steps of implementing thinning processing to a picture signal of higher resolution so that pixels in vertical and lateral directions are respectively 7/20 times and ⅜ times to generate a picture signal of lower resolution of the letter box system, and implementing a predetermined processing to a signal obtained by decoding a coded signal of the picture signal of lower resolution by using spatial filtering at a resolution of 20/7 times in longitudinal direction and ⅝ times in lateral direction, thus making it possible to generate a predictive picture signal of a picture signal of higher resolution. This method can be applied to a picture signal of higher resolution in which the number of pixels in lateral direction is 1920 and the number of pixels in longitudinal direction is 1024.

Further, the numbers of pixels in longitudinal and lateral directions of a picture signal of higher resolution are permitted to be respectively ⅓ times and ⅜ times.

Picture signal decoding methods corresponding to these picture signal coding methods can be realized. In addition, by applying these methods, it is possible to realize a coding apparatus and a decoding apparatus.

In the picture signal coding method according to this invention, picture signal of lower resolution is generated from picture signal of higher resolution so that different aspect ratio is provided. Accordingly, it is possible to generate, e.g., picture signal of lower resolution having aspect ratio of 4:3 from picture signal of higher resolution having aspect ratio of 16:9. As a result, it is possible to convert, e.g., picture signal of high vision into picture signal of lower resolution to transmit the picture signal of lower resolution to monitor it by image receiver of the NTSC system.

BRIEF DESCRIPTION OF THE DRAWINGS

FIG. 11 is a view for explaining down-sampling in longitudinal direction of the embodiment of FIG. 10.

FIG. 28 is a view for explaining the operation of predictive mode switching circuit 52 of FIG. 27.

FIG. 29 is a view for explaining the operation of DCT mode switching circuit 55 of FIG. 27.

BEST MODE FOR CARRYING OUT THE INVENTION

Figure 1B:
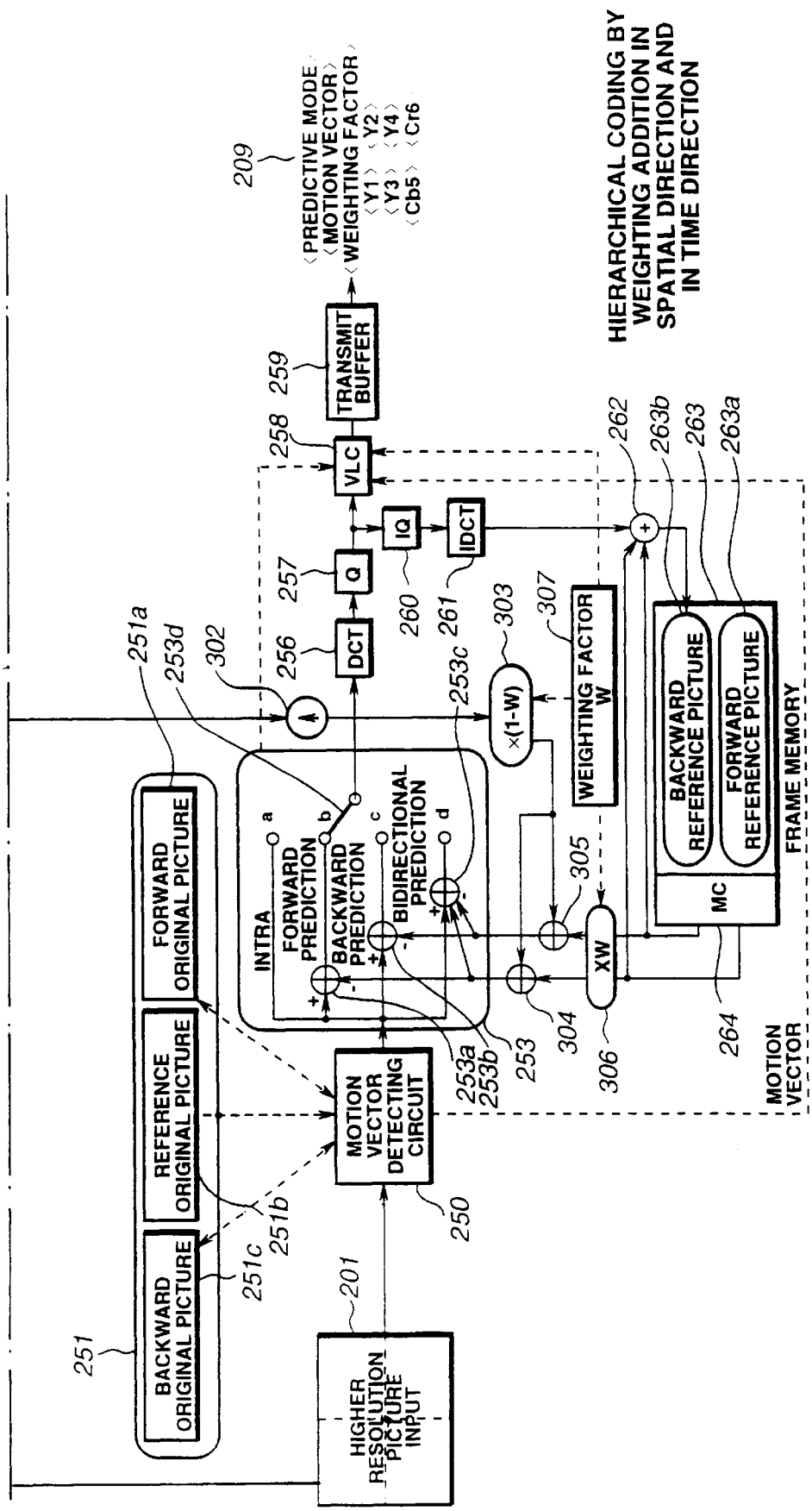
FIG. 1 is a block diagram showing the configuration of an embodiment of a picture signal coding apparatus according to this invention.

FIG. 1 is a block diagram showing the configuration of an embodiment of a picture signal coding apparatus (encoder) of this invention. In this embodiment, hierarchical coding is carried out. In the figure, blocks indicated by reference numerals in a range from more than 100 to less than 200 are blocks for carrying out processing of picture signal of lower resolution, and blocks indicated by reference numerals in a range from more than 200 to less than 300 are blocks for processing picture signal of higher resolution. Respective blocks for carrying out processing of hierarchies basically have a configuration similar to the encoder shown in FIG. 27. In FIG. 1, the lower order two digits of reference numerals in the range from more than 100 to less than 200 and in the range from more than 200 to less than 300 are caused to be in correspondence with reference numerals of two digits of corresponding functional blocks in FIG. 27.

Figure 27:
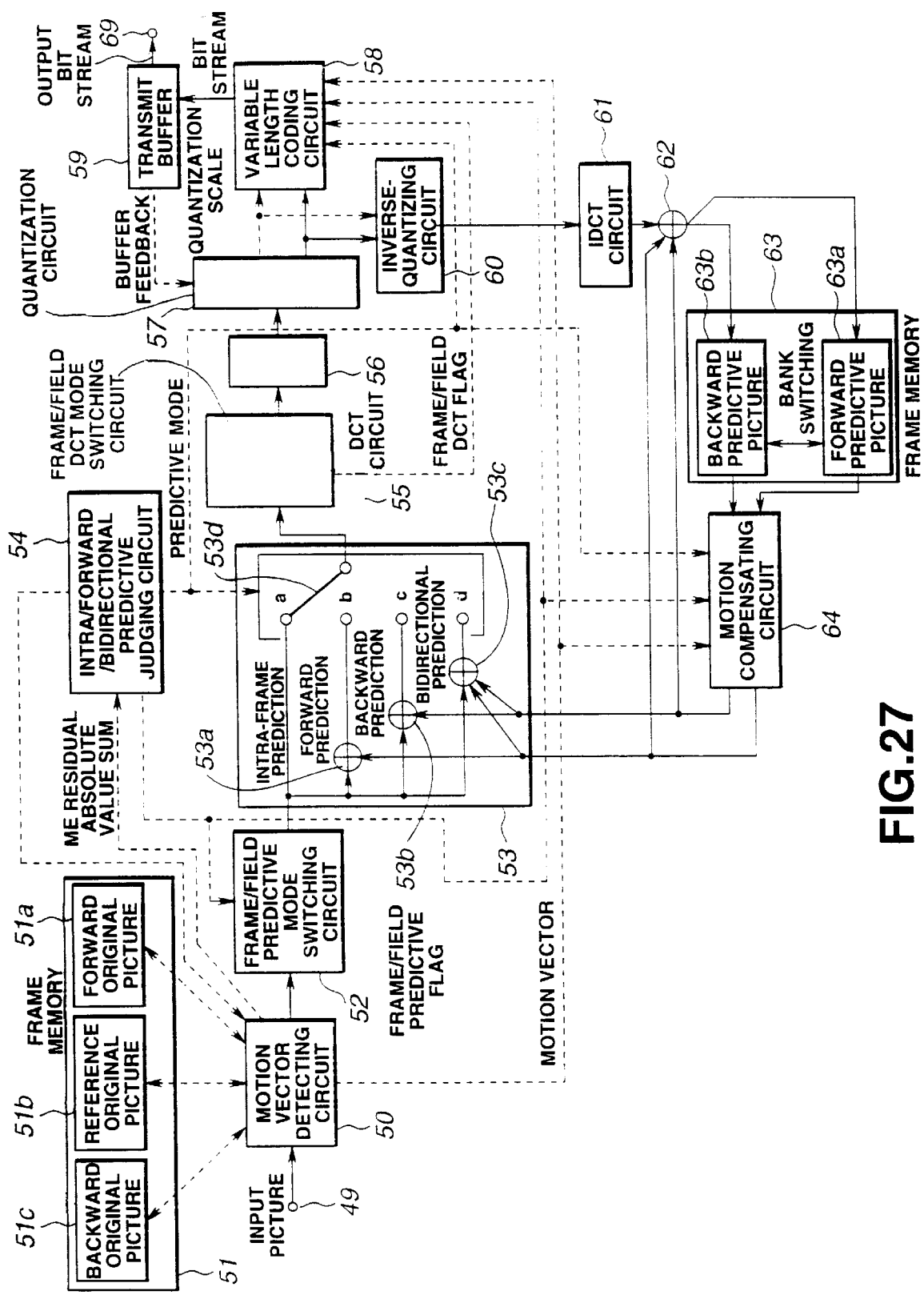
FIG. 27 is a block diagram showing an example of the configuration of encoder 18 of FIG. 25.

It is to be noted that while, in FIG. 1, indication of predictive mode switching circuit 52 and DCT mode switching circuit 55 in FIG. 27 is omitted for brevity, corresponding circuits are inserted also in the embodiment of FIG. 1. In addition, predictive judging circuit 54 in FIG. 27 is not illustrated in FIG. 1 for brevity, but operation section 153 in FIG. 1 is assumed to include this predictive judging circuit 54 as well.

Figure 2:
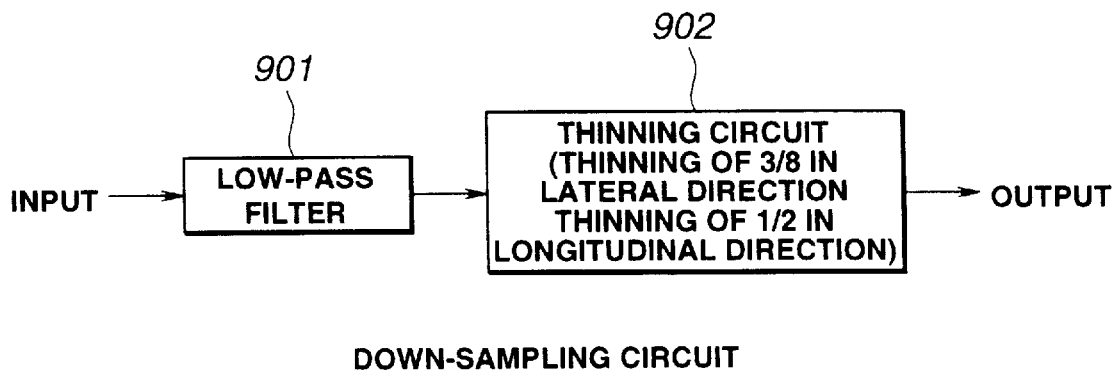
FIG. 2 is a block diagram showing an example of the configuration of down-sampling circuit 301 of FIG. 1.

As input picture, higher resolution picture 201 is prepared. This higher resolution picture is converted into ¼ resolution picture 101 through down-sampling circuit 301 for hierarchical coding. Down-sampling circuit 301 is composed, as shown in FIG. 2, of low-pass filter 901 for band limitation and thinning circuit 902 for thinning data. The detail of the operation of this down-sampling circuit 301 will now be described later.

Since processing of ¼ resolution picture 101 is basically similar to that in the case shown in FIG. 27, it will be briefly described. ¼ resolution picture 101 is inputted to motion vector detecting circuit 150. When such picture is inputted, motion vectors thereof are detected between reference original picture and forward original picture or backward original picture, or between reference original picture and forward original picture and between reference original picture and backward original picture which are read out as occasion demands in macro block units from frame memory 151 in accordance with picture sequence (sequence for processing I picture, P picture or B picture, etc.) set in advance.

Operation section 153 determines predictive mode of reference block on the basis of absolute value sum of interframe differences in block units calculated at motion vector detecting circuit 150. Moreover, predictive mode determined at operation section 153 is delivered to Variable Length Coding circuit (VLC) 158.

The operation section 153 carries out, on the basis of this predictive mode, switching of intra-coding mode, forward predictive mode, backward predictive mode or bidirectionally predictive mode in block units to generate input picture itself in the case of intra-coding mode, and to generate interframe coded data (difference data) from each corresponding predictive picture in the case of the forward, backward or bidirectionally predictive mode, thus to deliver this difference data to DCT circuit 156 through operation section 153.

This DCT circuit 156 implements Discrete Cosine Transform processing to input picture data or difference data in block units by making use of the two-dimensional correlation of picture signal to output DCT processed data obtained as the result thereof to quantizing circuit (Q) 157.

The quantizing circuit 157 quantizes DCT processed data at quantization step size determined every macroblock and slice to deliver quantized data obtained on the output terminal as the result thereof to Variable Length Coding (VLC) circuit 158 and Inverse Quantizing circuit (IQ) 160. Quantization scale used for quantization is determined so that it becomes equal to a value such that transmit buffer memory 159 does not break down by carrying out feedback of buffer memory residual of transmit buffer memory 159. This quantization scale is also delivered from quantizing circuit 157 to variable length coding circuit 158 and inverse quantizing circuit 160 along with quantized data.

In this case, VLC circuit 158 implements variable length coding processing to quantized data along with quantization scale, macro block type (predictive mode), and motion vector to deliver the data thus processed to transmit buffer memory 159 as transmit data.

Finally, bit stream 109 of ¼ resolution picture is transmitted in order of <predictive mode>, <motion vector>, <DCT coefficient>.

Inverse quantizing circuit 160 inverse-quantizes quantized data sent from quantizing circuit 157 so as to take a representative value to thereby convert it into inverse-quantized data to deliver the inverse-quantized data to Inverse Discrete Cosine Transform (IDCT) circuit 161. The IDCT circuit 161 transforms inverse quantized data decoded at inverse-quantizing circuit 160 into decoded picture data by transform processing complementary to that of DCT circuit 156 to output it to frame memory 163 through operation element 162.

Motion Compensation circuit (MC) 164 implements motion compensating processing to data stored in frame memory 163 on the basis of macro block type, motion vector, Frame/Field predictive Flag, Frame/Field DCT Flag, thus to generate a predictive picture signal. The operation element 162 adds this predictive picture signal and output data (difference data) of IDCT circuit 161 to carry out local decoding. The decoded picture is written into frame memory 163 as forward predictive picture or backward predictive picture.

At frame memory 163, bank switching is carried out as occasion demands. Thus, single frame is outputted as backward predictive picture, or is outputted as forward predictive picture in dependency upon picture to be coded. In the case of forward, backward or bidirectional prediction, since difference from predictive picture is sent as output of IDCT circuit 161, this difference is added, at operation element 162, to predictive picture outputted from motion compensating circuit 164, thus to carry out local decoding. This predictive picture is entirely the same picture as picture decoded at decoder, and forward, backward or bidirectional prediction is implemented to picture to be subsequently processed on the basis of the predictive picture.

While coding procedure of ¼ resolution picture has been described as above, output of the operation element 162 is delivered to up-sampling circuit 302 on the encoder side of high resolution picture as spatial predictive picture signal of high resolution picture signal, and it is utilized for prediction.

Coding procedure of higher resolution picture 201 will now be described. This coding procedure is entirely the same as coding procedure of ¼ resolution picture except for procedure for generating predictive picture signal.

Figure 3:
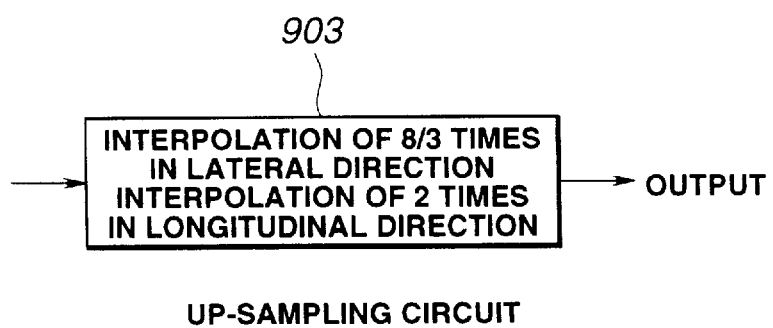
FIG. 3 is a block diagram showing an example of the configuration of up-sampling circuit 302 of FIG. 1.

Higher resolution picture 201 is delivered to operation section 253 through motion vector detecting circuit 250. This operation section 253 carries out, along with intra coding, forward, backward or bidirectional prediction by motion compensation from frame memory 263, or prediction from ¼ resolution picture. At coding of ¼ resolution picture, picture data outputted from operation element 162 is interpolation-processed by upsampling circuit 302 so as to have resolution similar to high resolution picture. Typical up-sampling circuit 302 is constituted by interpolating circuit 903, as shown in FIG. 3, for example. The detail of its operation will be described later.

Interpolation picture generated by up-sampling circuit 302 is inputted to weighting circuit 303. At this weighting circuit 303, output of up-sampling circuit 302 is multiplied by weight (1−W). This is assumed to be first predictive picture signal.

On the other hand, temporal predictive picture is outputted in correspondence with forward, backward or bidirectional motion compensation from motion compensating circuit 264. This predictive picture is multiplied by weight W by weighting circuit 306. This is assumed to be second predictive picture signal.

The above-mentioned first and second predictive picture signals are added at adder 304 or 305. Thus, third predictive picture signal is generated. By making use of the third predictive picture signal, prediction is carried out at operation section 253.

Weight W is determined at weight judging circuit 307 so that predictive efficiency of the third predictive picture signal becomes the highest. At the same time, this weight W is delivered to variable length coding circuit (VLC) 258, at which it is coded. Thus, coded weight data is transmitted.

Operation section 253 uses ¼ resolution picture as spatial predictive picture in addition to the conventional motion compensation in a manner stated above, thereby making it possible to obtain higher prediction efficiency. At this section, predictive mode is determined.

The determined predictive mode is delivered to variable length coding circuit 258, at which it is coded. Thus, coded predictive mode data is transmitted. Moreover, the predictive data mentioned above is delivered to DCT circuit 256. Other processing are the same as coding of ¼ resolution picture.

Finally, bit stream 209 of high resolution picture is transmitted in order of <predictive mode>, <motion vector>, <weight W> and <DCT coefficient>.

Procedure for decoding data which has been hierarchically-coded and has been transmitted in this way will now be described.

Figure 4:
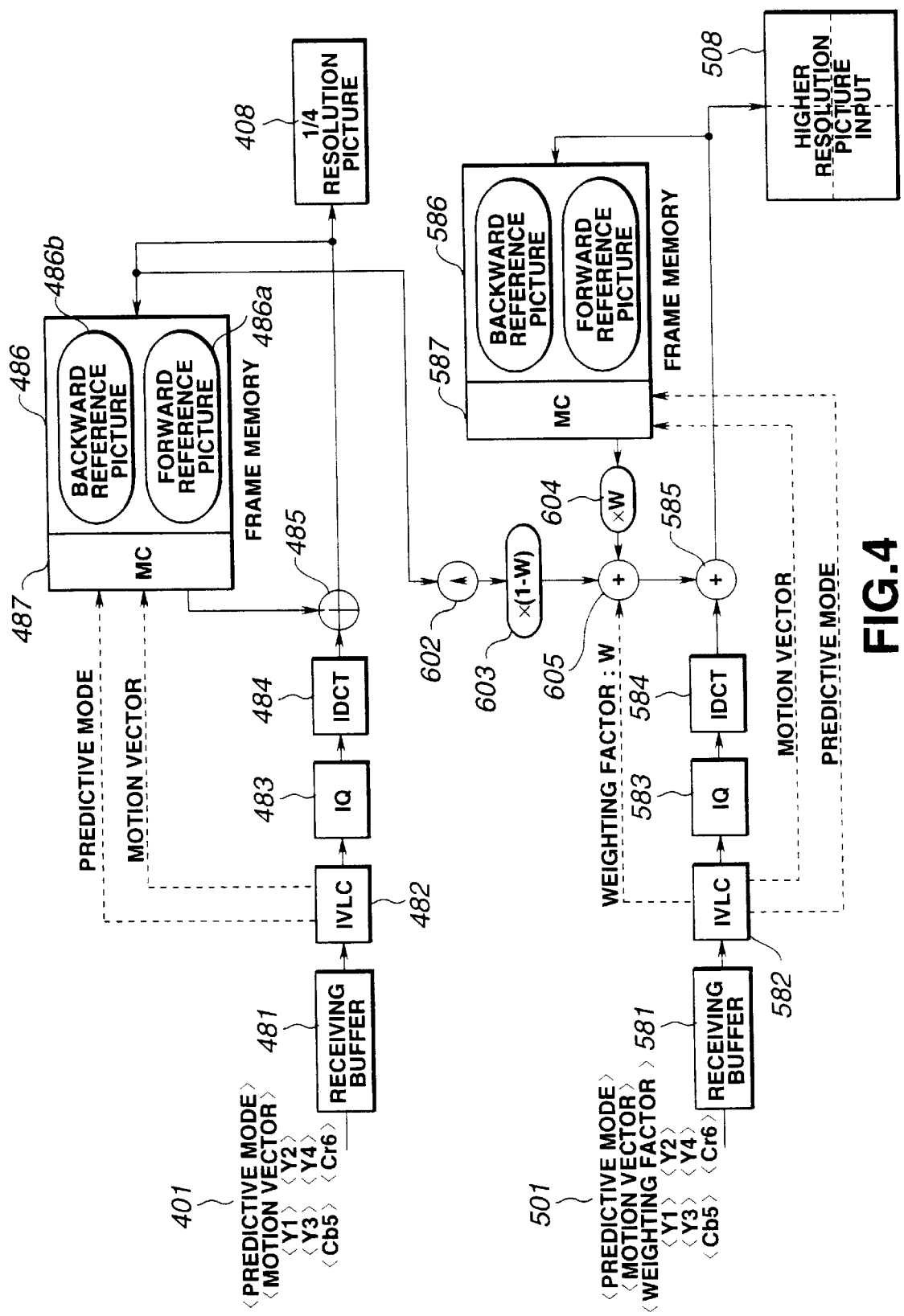
FIG. 4 is a block diagram showing the configuration of an embodiment of a picture signal decoding apparatus according to this invention.

Block diagram of decoder of hierarchically-coded data is shown in FIG. 4. In this figure, reference numerals in a range from more than 400 to less than 500 represent blocks for decoding picture signal of ¼ resolution, and reference numerals in a range from more than 500 to less than 600 represent blocks for decoding picture signal of higher resolution. The fundamental operations of respective blocks are similar to that in the case shown in FIG. 30, and reference numerals of the lower order two digits of respective blocks are caused to be in correspondence with reference numerals of two digits of corresponding blocks of FIG. 30.

Figure 25:
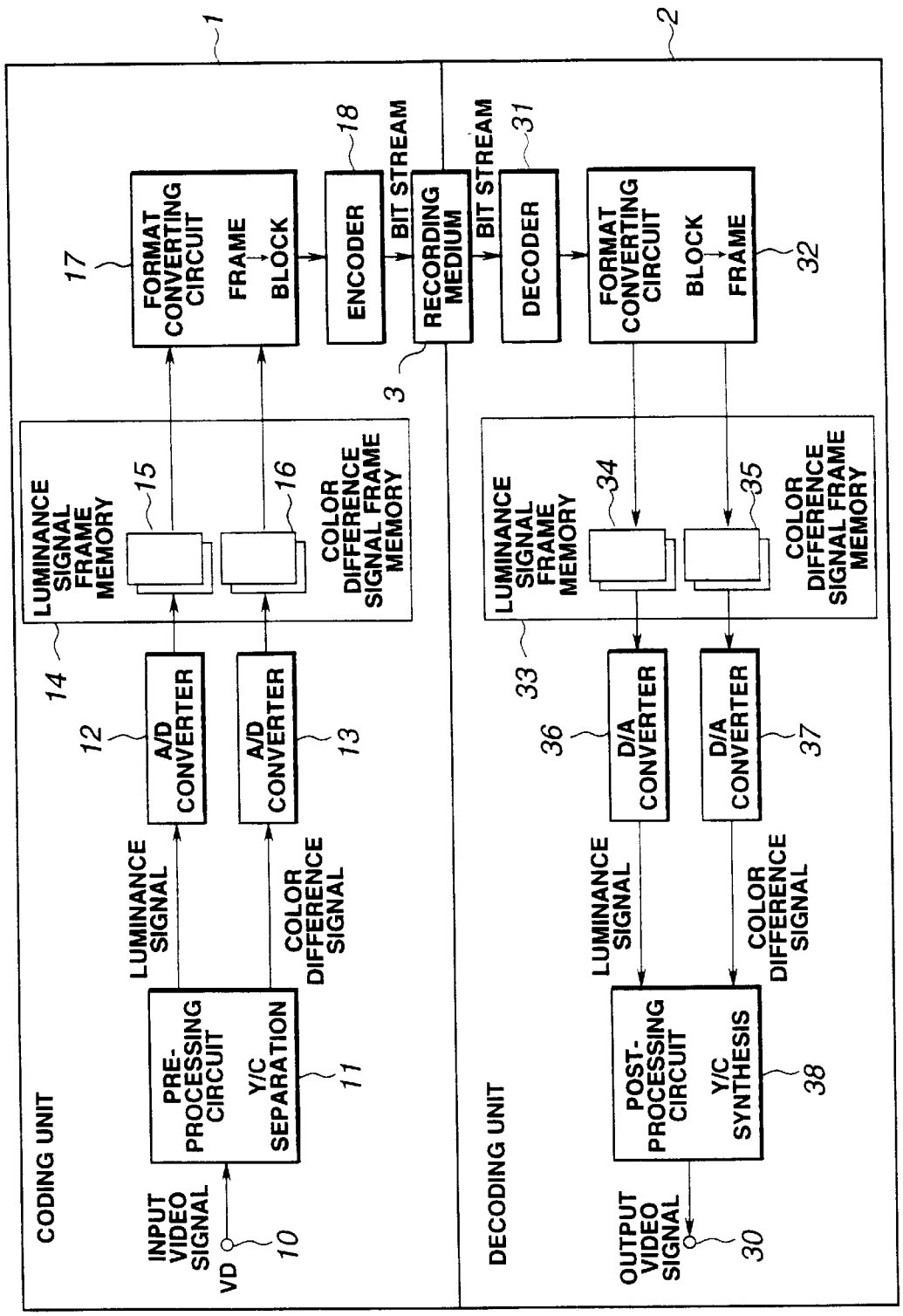
FIG. 25 is a block diagram showing the configuration of conventional moving picture coding/decoding apparatuses.
Figure 26:
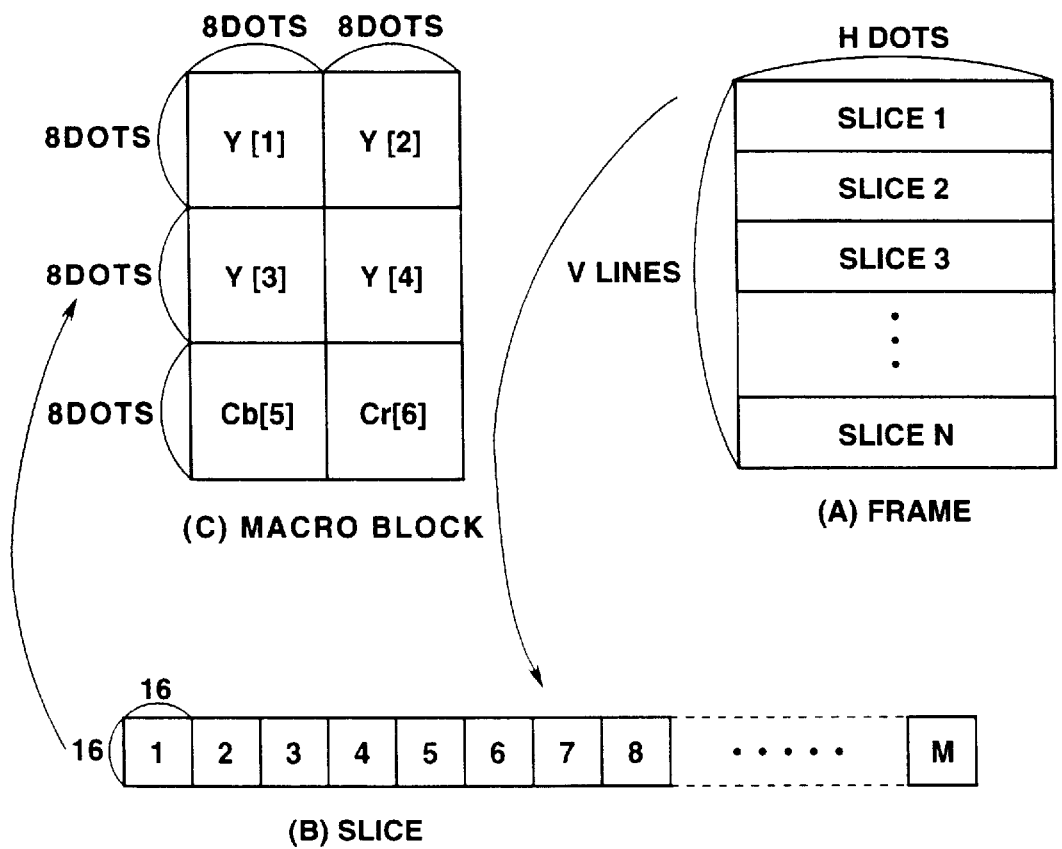
FIG. 26 is a view for explaining structure of picture data.

Bit stream 401 of ¼ resolution (corresponding to output 109 of transmit buffer 159 of FIG. 1) is decoded in the same manner as in the prior art. ¼ resolution bit stream 401 is inputted through transmit medium (e.g., recording medium 3 of FIG. 25). This bit stream is inputted to variable length decoding (Inverse Variable Length Coding) (IVLC) circuit 482 through receiving buffer 481. The variable length decoding circuit (IVLC) 482 decodes, from bit stream, quantized data, motion vector, macro block type, quantization scale, Frame/Field prediction Flag, and Frame/Field DCT Flag. The quantized data and the quantization scale are inputted to the next inverse quantizing circuit (IQ) 483.

Figure 30:
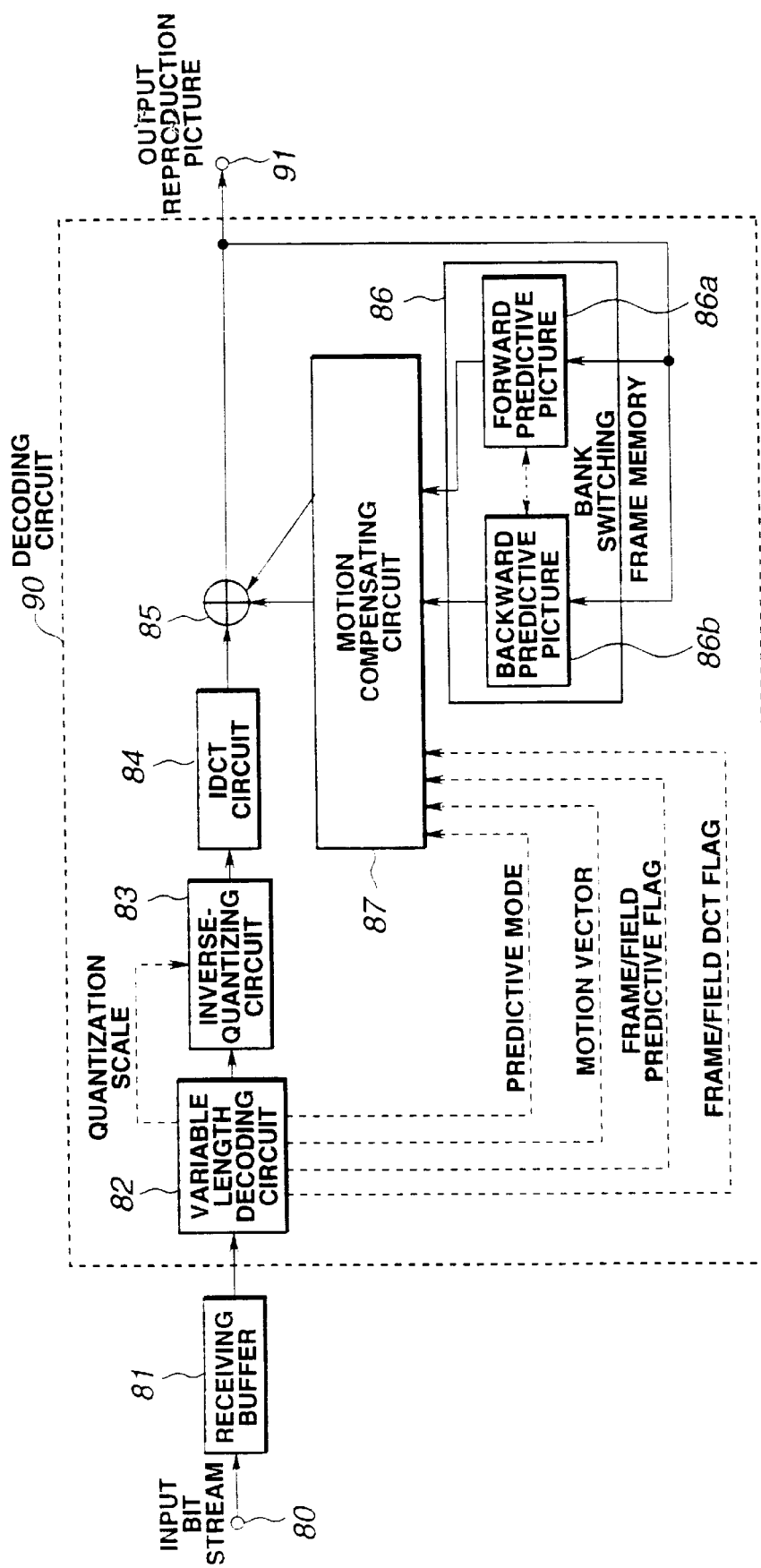
FIG. 30 is a block diagram showing an example of the configuration of decoder 31 of FIG. 25.
Figure 31:
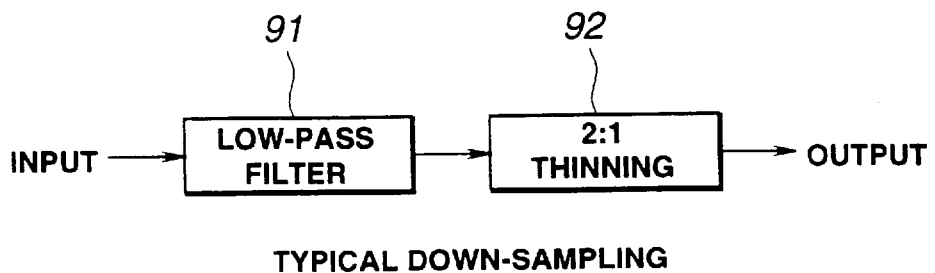
FIG. 31 is a block diagram showing an example of the configuration of conventional down-sampling circuit.
Figure 32:
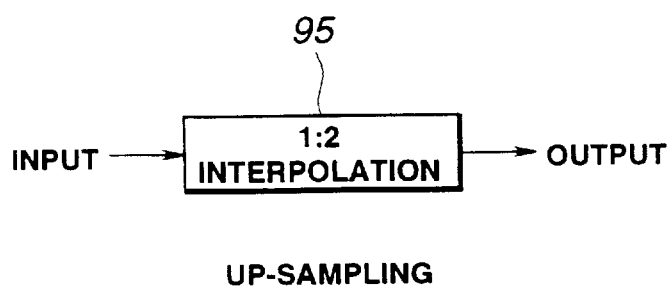
FIG. 32 is a block diagram showing an example of the configuration of conventional up-sampling circuit.
Figure 33:
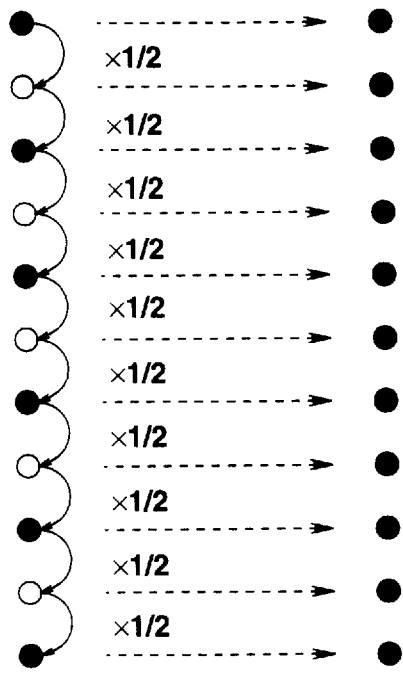
FIG. 33 is a view for explaining the operation of interpolating circuit 95 of FIG. 32.

The operations of inverse quantizing circuit 483, IDCT circuit 484, operation element 485, frame memory 486, and motion compensating circuit 487 are similar to those in the case described in the explanation of decoder of FIG. 30. Aa a processed output of these circuits, ¼ resolution picture 408 is obtained. At the same time, decoded picture is stored into frame memory 486 for the purpose of prediction of the next picture.

On the other hand, picture stored in this frame memory 486 is inputted to up-sampling circuit 602 of high resolution decoding apparatus as spatial predictive picture signal used for decoding of higher resolution picture. This up-sampling circuit 602 is comprised of interpolating circuit 903, as shown in FIG. 3, similarly to the up-sampling circuit 302 of FIG. 1. Data caused to undergo up-sampling by the up-sampling circuit 302 is delivered to weighting circuit 603, at which it is multiplied by weight of (1−W). This is assumed to be first predictive picture with respect to high resolution decoding apparatus.

At the high resolution decoding apparatus, decoding is carried out after undergoing entirely the same processing as ¼ resolution picture signal. Namely, high resolution bit stream 501 is inputted through transmit media. This bit stream is inputted to variable length decoding (Inverse Variable Length coding) (IVLC) circuit 582 through receiving buffer 581, at which it is decoded.

The variable length decoded data is processed by inverse quantizing circuit (IQ) 583, IDCT circuit 584, operation element 585, frame memory 586, and motion compensating circuit 587. Output from the motion compensating circuit 587 is inputted to weighting circuit 604, and is multiplied by weighting coefficient W thereat. Thus, second predictive picture signal is formed.

This second predictive picture signal and the above-mentioned first predictive picture signal from the ¼ resolution picture are added at adder 605, resulting in third predictive picture signal for high resolution decoding apparatus. The third predictive picture signal is added, at operation element 585, to difference data outputted from IDCT circuit 584. Thus, original picture of higher resolution picture is decoded. This higher resolution picture 508 is stored into frame memory 586 for the purpose of prediction of the next picture at the same time.

Here, weight utilized is weight W used in the weighting circuit 306 of FIG. 1. This weight is obtained from IVLC circuit 582 via decoder of bit stream 209 (501).

In a manner stated above, decoding of higher resolution picture is carried out.

Figure 5:
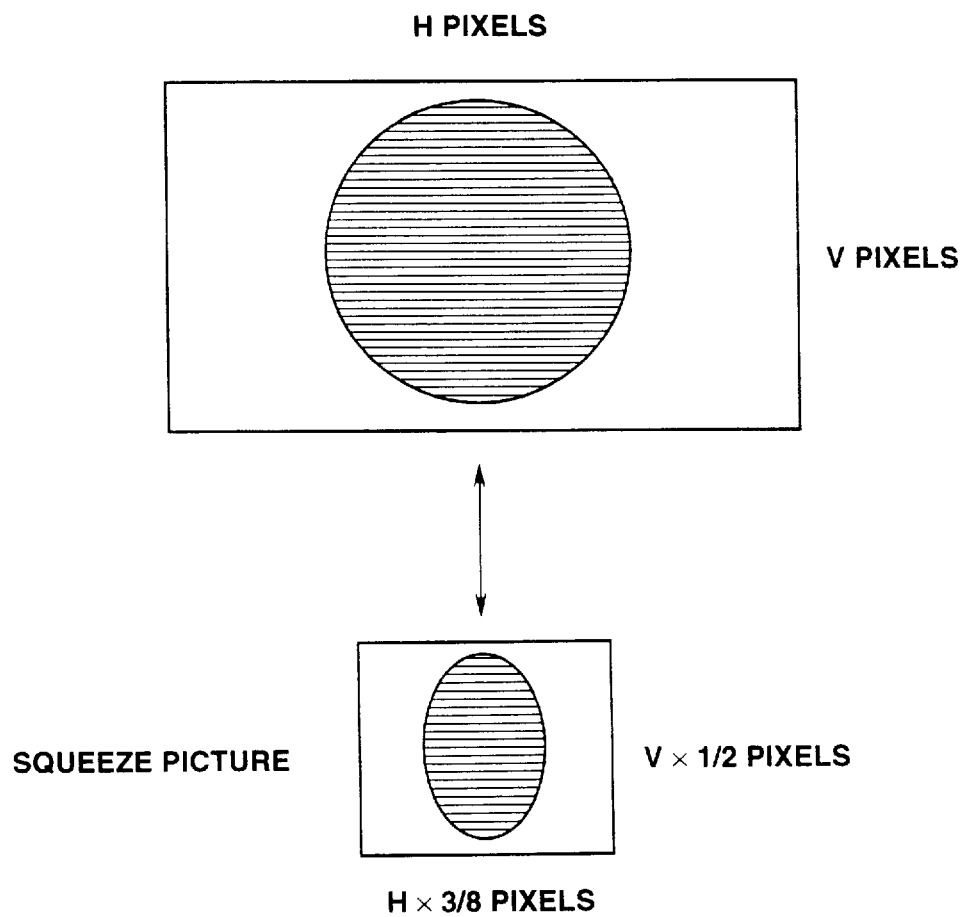
FIG. 5 is a view for explaining an example of first processing in the down-sampling circuit 301 of FIG. 1.

FIG. 5 shows an example of the relationship between resolution of higher resolution picture and that of lower resolution picture. Namely, in this example, higher resolution picture 201 of FIG. 1 has resolution of H pixels in lateral direction and V pixels in longitudinal (vertical) direction. This higher resolution picture 201 is converted into lower resolution picture 101 having resolution of H×⅜ pixels in lateral direction and V×½ pixels in longitudinal direction by down-sampling circuit 301. This lower resolution picture is picture of format of the so-called squeeze system (picture becomes long in longitudinal direction).

Such a down-sampling is realized by down-sampling circuit of a structure -shown in FIG. 2. Namely, input signal is band-limited by low-pass filter 901, and is then inputted to thinning circuit 902. Thus, such input signal is thinned so that pixels in lateral and longitudinal directions respectively become equal to ⅜ pixels in lateral direction and ½ pixels in longitudinal direction.

Figure 6:
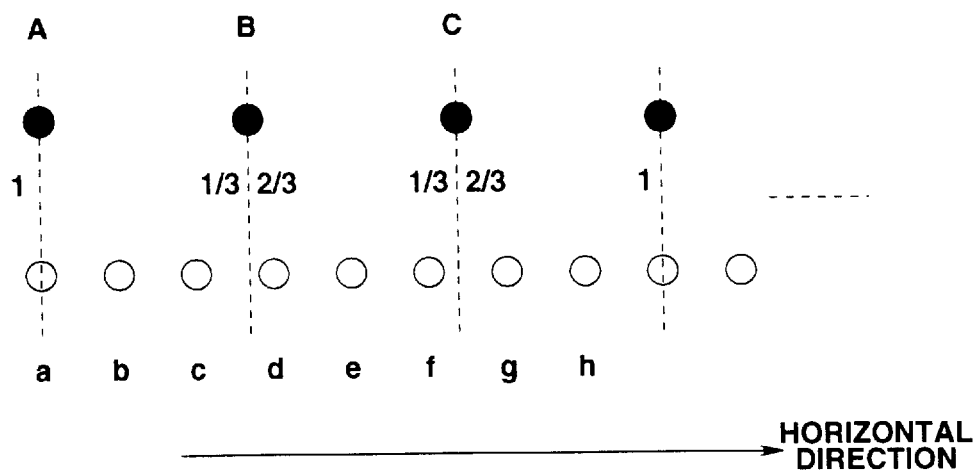
FIG. 6 is a view for explaining down-sampling in lateral direction in the embodiment of FIG. 5.

FIG. 6 shows the principle of thinning in lateral direction of down-sampling circuit 301 (thinning circuit 902). As an example for the purpose of carrying out thinning in a simple manner, coefficients (1, ⅓, ⅔) shown in FIG. 6 are represented by using inverse numbers of ratios between distances of adjacent input pixels corresponding to output pixel positions. Values obtained by multiplying pixel values of adjacent pixels by these coefficients to add them provide values of output pixels. It should be noted that when position of input pixel and position of output pixel are equal to each other, value of input pixel provides a value of output pixel as it is.

Namely, input pixel a of eight input pixels a to h is outputted as output pixel A as it is. Value obtained by multiplying input pixel c by ⅓ and value obtained by multiplying input pixel d by ⅔ are added. Thus, output pixel B is generated. Moreover, value obtained by multiplying input pixel f by ⅓ and value obtained by multiplying input pixel g by ⅔ are added. Thus, output pixel C is generated. In this way, three output pixels are interpolated from eight input pixels.

Figure 7:
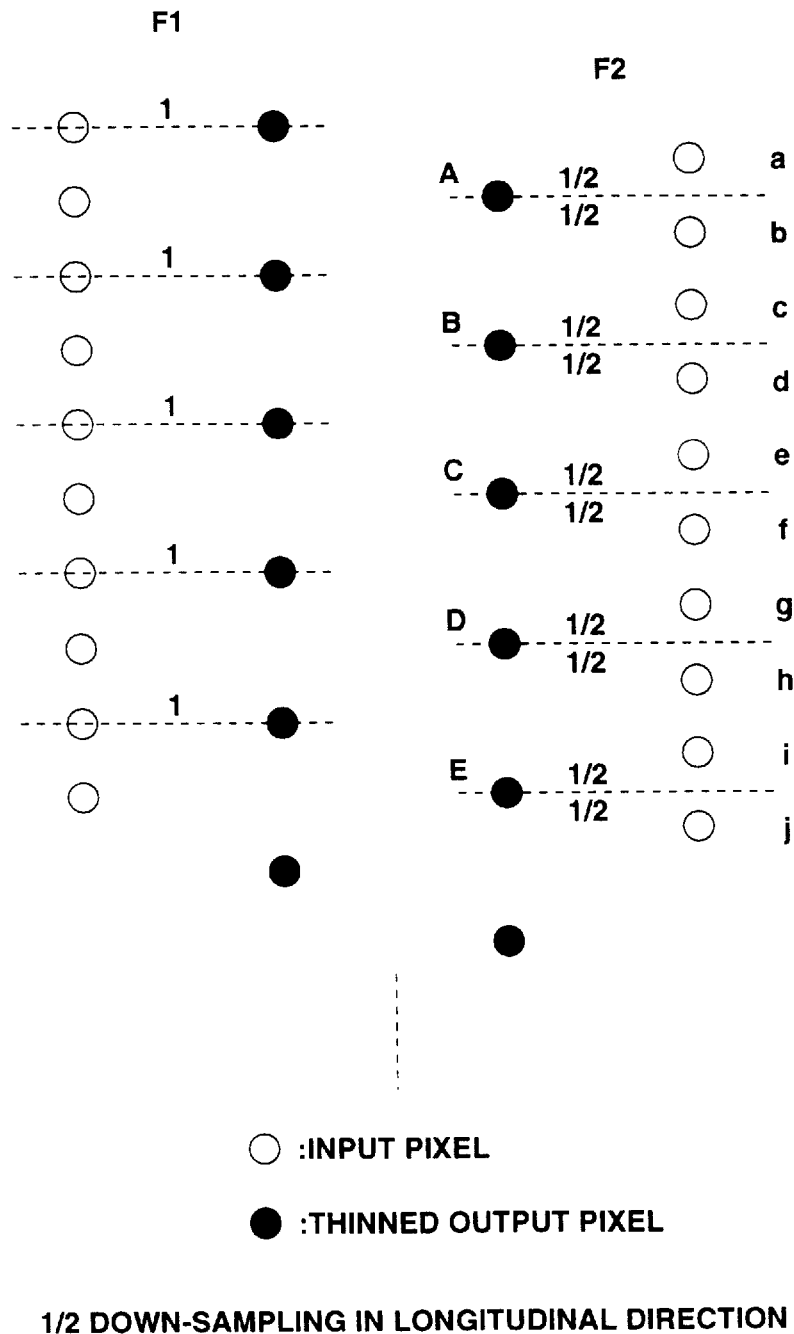
FIG. 7 is a view for explaining down-sampling in longitudinal direction in the embodiment of FIG. 5.

FIG. 7 shows the principle of thinning in longitudinal direction of down-sampling circuit 301 (thinning circuit 902). By taking into consideration the interlace structure of picture, thinning is carried out so that the number of pixels in longitudinal directions becomes equal to one half thereof. As an example for the purpose of carrying out thinning in a simple manner, coefficients (1, ½) shown in FIG. 7 are represented by using inverse numbers of ratios between distances of adjacent input pixels corresponding to output pixel positions. Values obtained by multiplying pixel values of adjacent pixel by these coefficients to add them provide values of output pixels. It should be noted that when position of input pixel and position of output pixel are equal to each other, value of input pixel provides a value of output pixel as it is.

Namely, in the first field F1, lines are thinned every other line. In the second field F2, input pixels a and b, c and d, e and f, etc. of lines adjacent in upper and lower directions are multiplied by coefficients of ½ and respective multiplied values thus obtained are added. Thus, output pixels A, B, C, etc. are constructed (generated).

In this way, lower resolution picture of ⅜ times in lateral direction and ½ times in longitudinal direction shown in FIG. 5 is obtained.

When down-sampling circuit 301 of FIG. 1 operates in a manner stated above, interpolating circuit 903 of FIG. 3 constituting up-sampling circuits 302 and 602 of FIGS. 1 and 4 interpolates data so as to have resolution of ⅔ times in lateral direction and 2 times in longitudinal direction.

Figure 8:
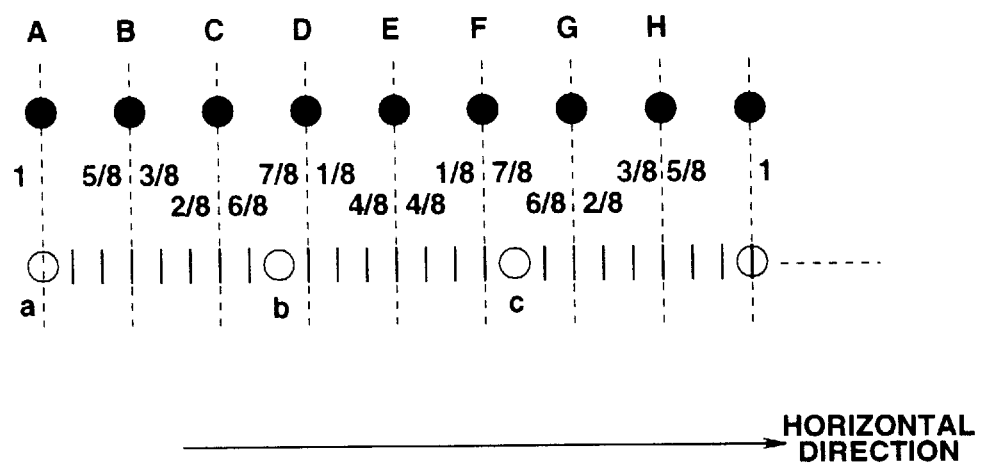
FIG. 8 is a view for explaining processing of up-sampling corresponding to the down-sampling of FIG. 6.

FIG. 8 shows the principle of interpolation of ⅔ times in lateral direction. As an example for the purpose of carrying out simple interpolation, coefficients (1, ⅞, 6/8, ⅝, 4/8, ⅜, 2/8, ⅛) shown in FIG. 8 are represented by using inverse numbers of distances of adjacent input pixels corresponding to output pixel positions. Values obtained by multiplying pixel values of adjacent pixels by the above coefficients to add them provide values of output pixels. It should be noted that when position of input pixel and position of output pixel are equal to each other, value of input pixel provides a value of output pixel as it is.

Namely, input pixel a is caused to be output pixel A as it is. Value obtained by multiplying input pixel a by coefficient ⅝ and value obtained by multiplying input pixel b by ⅜ are added, resulting in output pixel B. Output pixels succeeding thereto are similarly interpolated.

Figure 9:
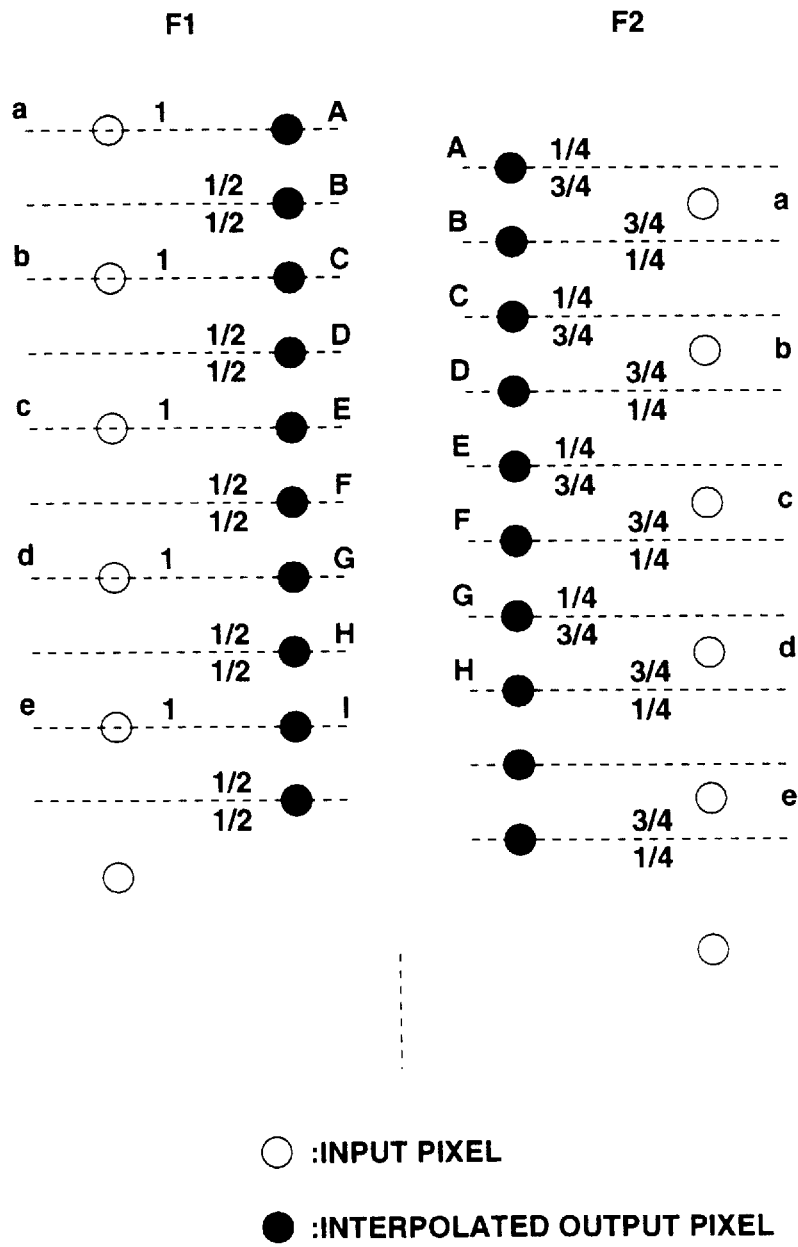
FIG. 9 is a view for explaining processing of up-sampling corresponding to the down-sampling of FIG. 7.

FIG. 9 shows the principle of interpolation of two times in longitudinal direction. By taking into consideration interlace structure of picture, interpolation of two times is carried out in longitudinal direction. As an example for the purpose of carrying out simple interpolation, coefficients (1, ¾, ½, ¼) shown in FIG. 9 are represented by using inverse numbers of distances of adjacent input pixels corresponding to output pixel positions. Values obtained by multiplying pixel values of adjacent pixels by these coefficients to add them provides values of output pixels. It should be noted that when position of input pixel and position of output pixel are equal to each other, value of input pixel provides a value of output pixel as it is.

Namely, in the first field F1, input pixels a, b, c, etc. are caused to be respectively output pixels A, C, E, etc. as they are, and, e.g. , output pixel D therebetween is generated by multiplying input pixels b and c by ½ to add them. In the second field F2, e.g., value obtained by multiplying input pixel b by ¾ and value obtained by multiplying input pixel c by ¼ are added. Thus, output pixel D is generated.

In the embodiment shown in FIG. 5, higher resolution pixel having 1920 pixels in lateral direction and 960 pixels in longitudinal direction can be converted into lower resolution picture having 720 pixels in lateral direction and 480 pixels in longitudinal direction, and higher resolution picture having 1920 pixels in lateral direction and 1152 pixels in longitudinal direction can be converted into lower resolution picture having 720 pixels in lateral direction and 576 pixels in longitudinal direction.

Thus, e.g., picture of the high-vision system of aspect ratio of 16:9 is caused to have lower resolution, thus making it possible to monitor such picture on an image receiver of the NTSC system of aspect ratio of 4:3.

Figure 10:
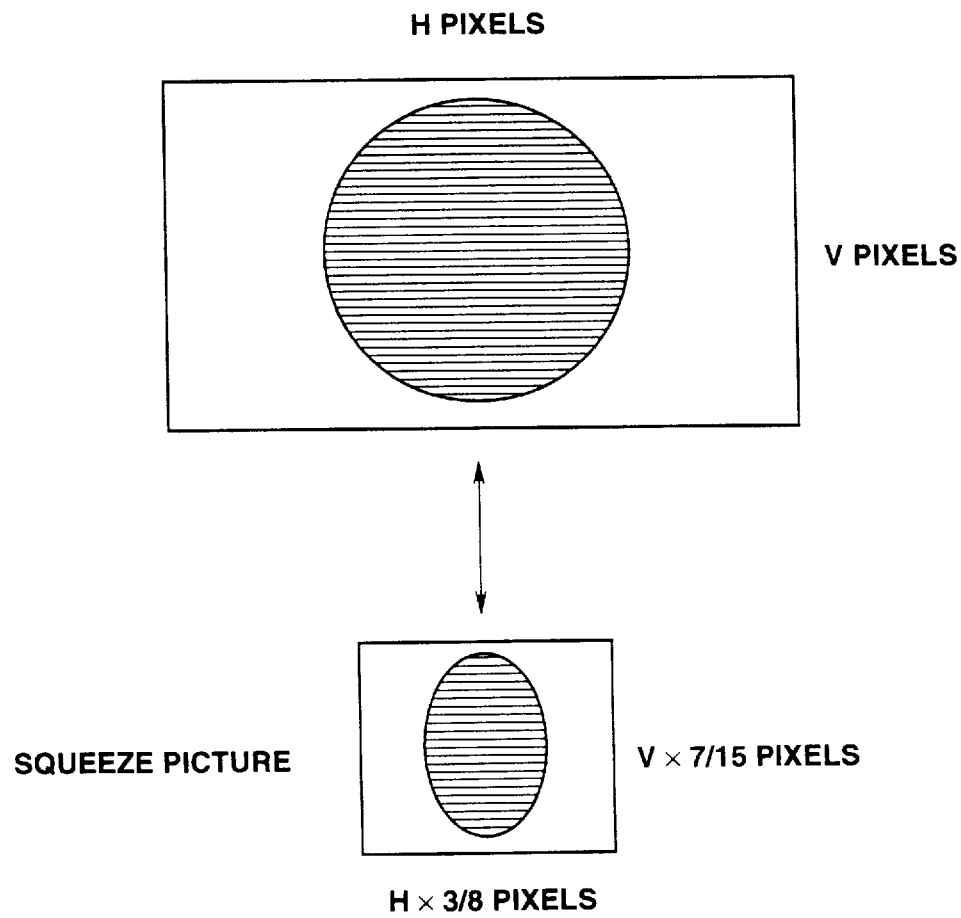
FIG. 10 is a view for explaining an example of a second processing in the down-sampling circuit 301 of FIG. 1.

FIG. 10 shows another example of the relationship between resolutions of higher resolution picture and lower resolution picture. In this example, higher resolution picture has resolution of H pixels in lateral direction and V pixels in longitudinal direction, and lower resolution picture has resolution of H×⅜ pixels in lateral direction and V×7/15 pixels in longitudinal direction. This lower resolution picture also has picture of the squeeze system.

In the case of this embodiment, it is required to allow ratios of thinning in lateral and longitudinal directions to be respectively ⅜ and 7/15. Down-sampling of ⅜ times in lateral direction can be realized by the principle shown in FIG. 6.

FIG. 11 shows the principle for thinning pixels in longitudinal direction so that its number is equal to 7/15. Also in this case, by carrying out weighting as indicated by the following formula by inverse number of ratio between distances a and b with respect to input pixels x, y, output pixel z can be obtained.

$z = x(b/(a+b)) + y(a/(a+b))$

Thus, seven output pixels are interpolated from fifteen input pixels.

Moreover, in the case of this embodiment, in the up-sampling, it is required to allow ratios of thinning in lateral and longitudinal directions to be respectively ⅔ and 15/7. Interpolation of ⅔ times in lateral direction can be realized by the principle shown in FIG. 8.

Figure 12:
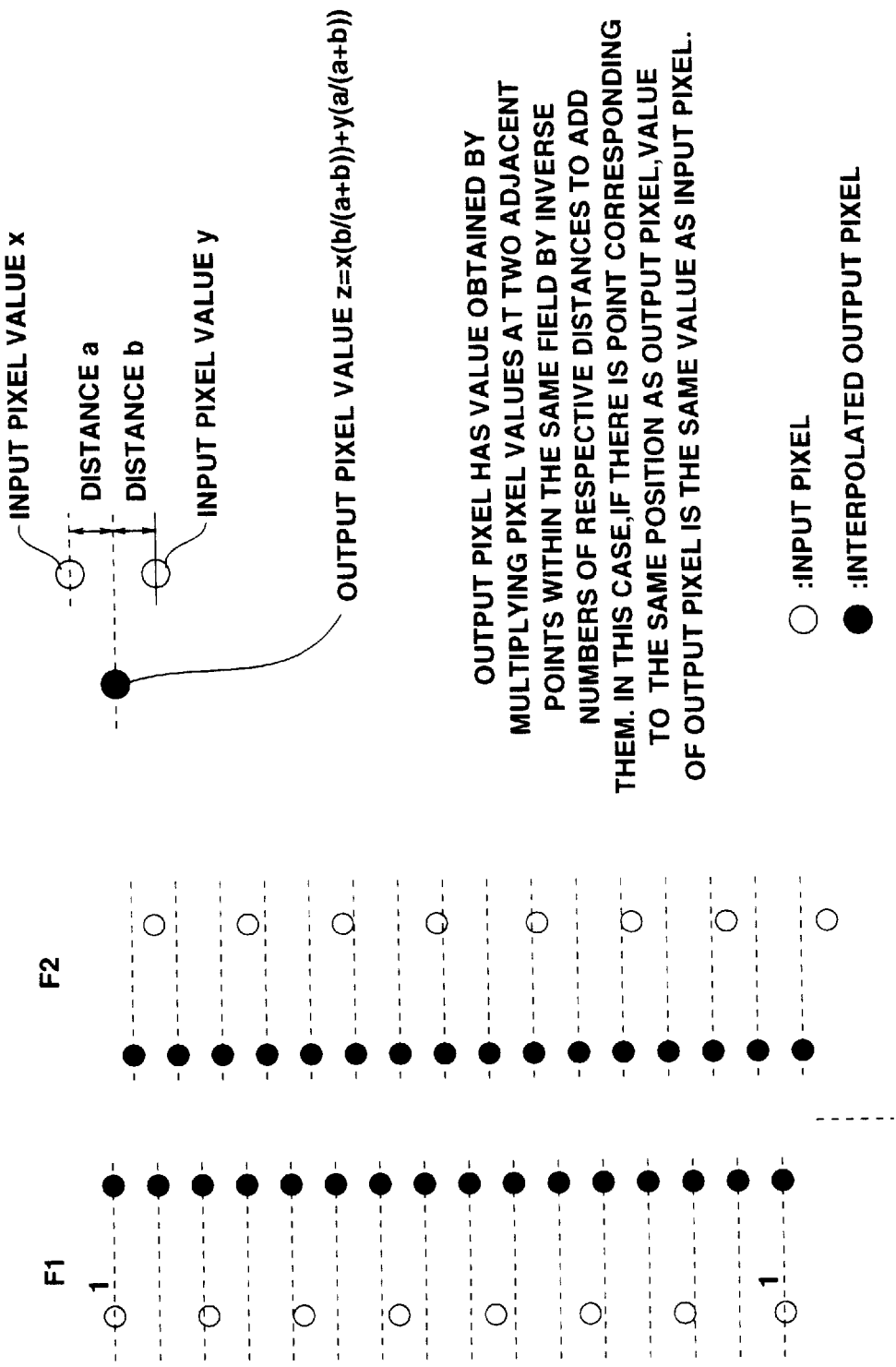
FIG. 12 is a view for explaining processing of up-sampling corresponding to the down-sampling of FIG. 11.

Up-sampling of 15/7 times in longitudinal direction can be realized on the basis of the principle as shown in FIG. 12. Namely, also in this case, by carrying out weighting as indicated by the following formula by inverse number of ratio between distances a and b corresponding to input pixels x, y, output pixel z can be obtained.

$z = x(b/(a+b)) + y(a/(a+b))$

It is sufficient to generate fifteen output pixels from seven input pixels on the basis of the above-mentioned principle.

Embodiment of FIG. 10 can be applied to the case where higher resolution picture having 1920 pixels in lateral direction and 1024 pixels in longitudinal direction is converted into lower resolution picture having 720 pixels in lateral direction and 483 pixels in longitudinal direction. When down-sampling of 7/15 times is implemented, in longitudinal direction, to 1024 pixels in longitudinal direction, the number of pixels obtained is less than 483 pixels. In this case, such a processing is carried out to add several lines of non-picture to upper and lower end portions of picture, etc.

Figure 13:
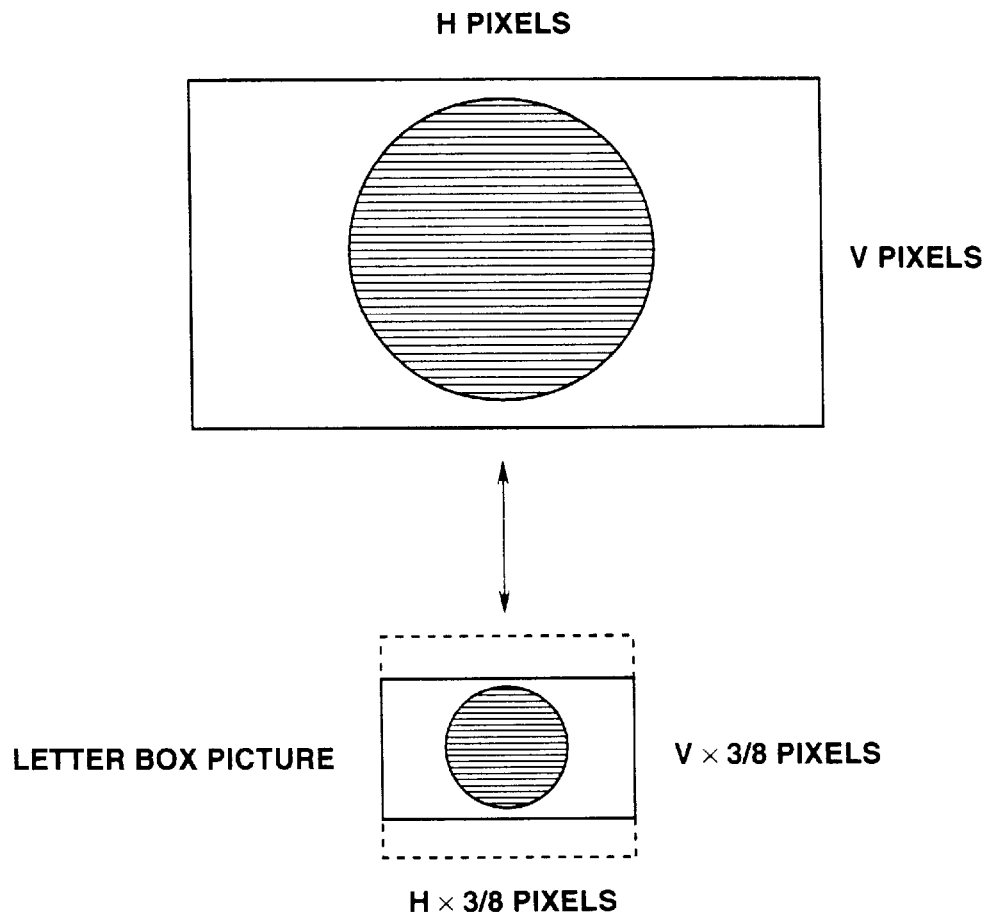
FIG. 13 is a view for explaining an example of a third processing in the down-sampling circuit 301 of FIG. 1.

FIG. 13 shows a still further embodiment. In this embodiment, picture of higher resolution of H pixels in lateral direction and V pixels in longitudinal direction is converted into lower resolution picture having resolution of H×⅜ pixels in lateral direction and V×⅜ pixels in longitudinal direction. This lower resolution picture is caused to be picture of format of the letter box system (pixels are not distorted, but it is necessary to carry out display with non-picture data being inserted at upper and lower portions).

Namely, in this embodiment, since picture of higher resolution is caused to undergo down-sampling at the same ratio in lateral and longitudinal directions, picture of lower resolution has the same aspect ratio as that of picture of higher resolution. For example, in image receiver of the NTSC system, this lower resolution picture is processed as picture of the letter box system. Namely, picture is displayed with a necessary number of lines (non-picture) being added to upper and lower portions of picture transmitted.

Figure 14:
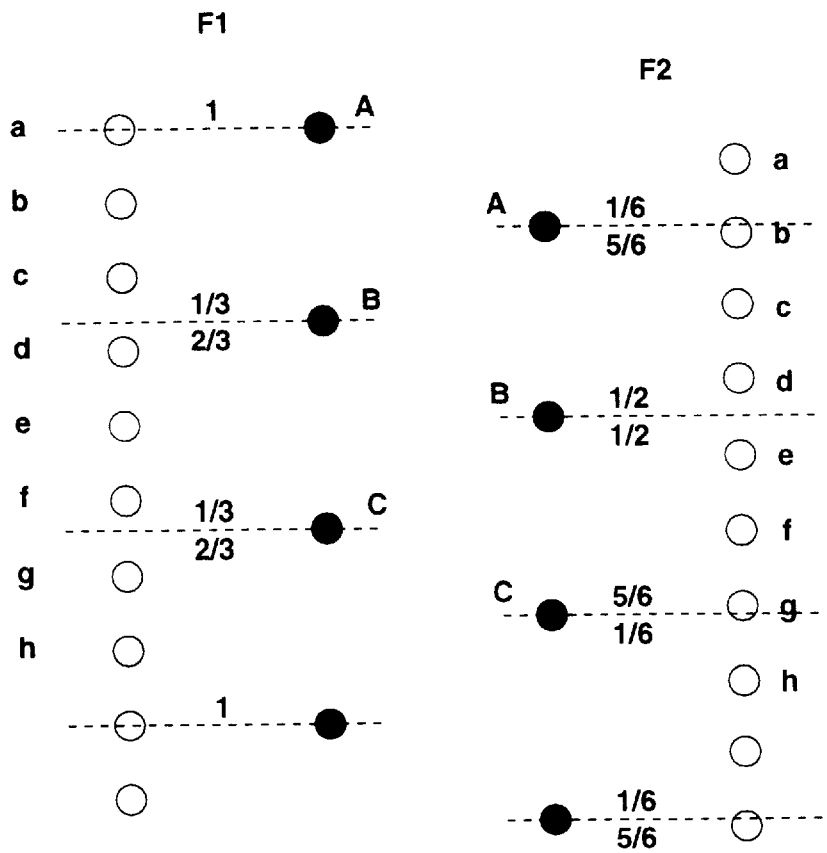
FIG. 14 is a view for explaining the down-sampling in longitudinal direction of the embodiment of FIG. 13.

Down-sampling of ⅜ times in lateral direction can be realized in accordance with the principle shown in FIG. 6. Moreover, down-sampling of ⅜ times in longitudinal direction can be realized in accordance with the principle shown in FIG. 14, for example.

Namely, in this embodiment, in the first field F1, input pixel a is outputted as output pixel A as it is. Value obtained by multiplying input pixel c by ⅓ and value obtained by multiplying input pixel d by ⅔ are added, thus to generate output pixel B. Further, value obtained by multiplying input pixel f by ⅓ and value obtained by multiplying input pixel g by ⅔ are added, thus to generate output pixel C.

On the other hand, in the second field F2, value obtained by multiplying input pixel a by ⅙ and value obtained by multiplying input pixel b by ⅚ are added. Thus, output pixel A is generated. Moreover, value obtained by multiplying input pixel d by ½ and value obtained by multiplying input pixel e by ½ are added. Thus, output pixel B is generated. Further, value obtained by multiplying input pixel g by ⅚ and value obtained by multiplying input pixel h by ⅙ are added, thus to generate output pixel C. In a manner stated above, data of three lines are generated from data of eight lines.

Up-sampling of ⅜ times in lateral direction can be realized in accordance with the principle shown in FIG. 8 as described above.

Figure 15:
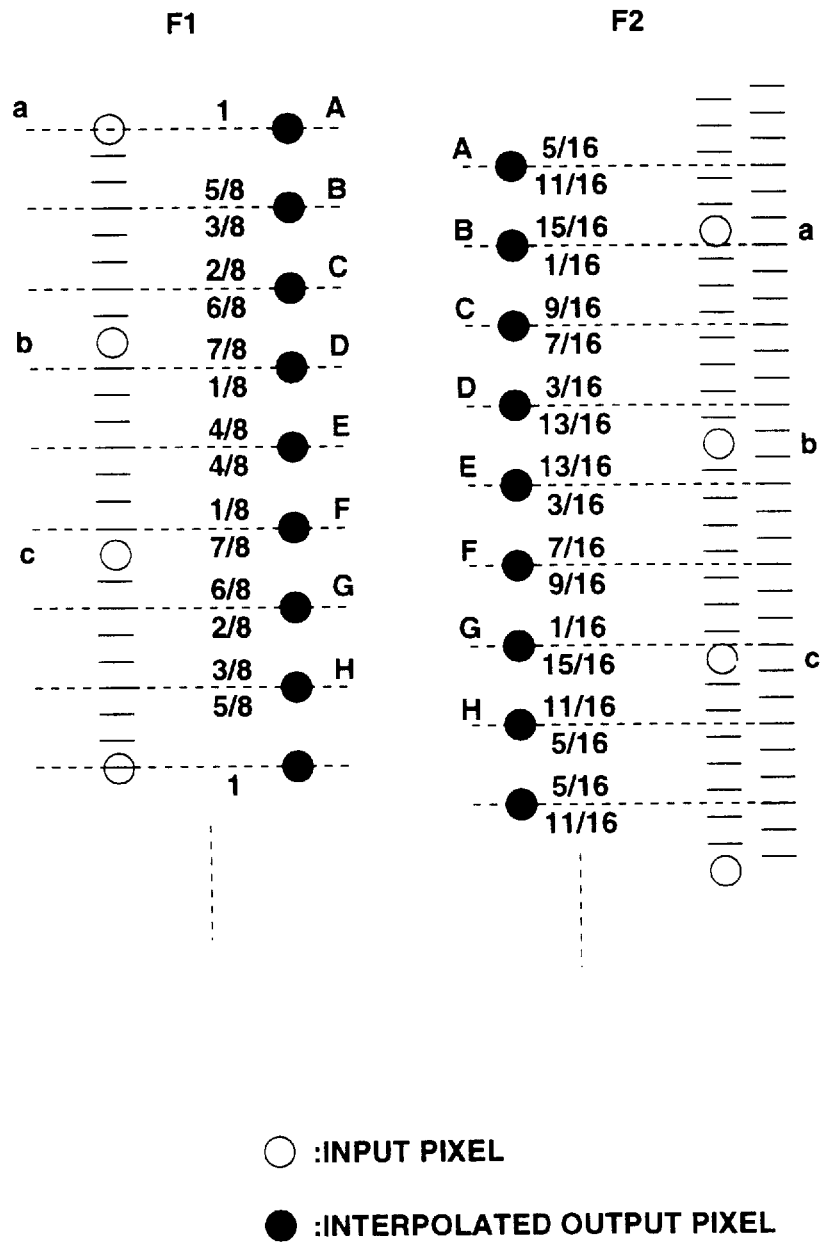
FIG. 15 is a view for explaining up-sampling corresponding to the down-sampling of FIG. 14.

Up-sampling of ⅜ times in longitudinal direction can be realized in accordance with the principle shown in FIG. 15. Namely, in the first field F1, input pixel a is caused to be output pixel A as it is. Output pixel B is generated by adding value obtained by multiplying input pixel a by ⅝ and value obtained by multiplying input pixel b by ⅜. Further, output pixel C is generated by adding value obtained by multiplying input pixel a by ⅖ and value obtained by multiplying input pixel b by ⅚. Also with respect to data subsequent thereto, similarly to the above, data of output pixels are generated by multiplying adjacent input pixels by coefficients shown to add them.

Also in the second field F2, similarly to the above, output pixels are generated by multiplying input pixels by predetermined coefficients. In this way, data of eight lines are generated from data of three lines.

Embodiment shown in FIG. 13 can be applied to, e.g., the case where down-sampling is carried out so that higher resolution picture of 1920 pixels in lateral direction and 960 pixels in longitudinal direction is converted into lower resolution picture of 720 pixels in lateral direction and 360 pixels in longitudinal direction, or the case where down-sampling is carried out so that higher resolution picture of 1920 pixels in lateral direction and 1152 pixels in longitudinal direction is converted into lower resolution picture of 720 pixels in lateral direction and 432 pixels in longitudinal direction.

Figure 16:
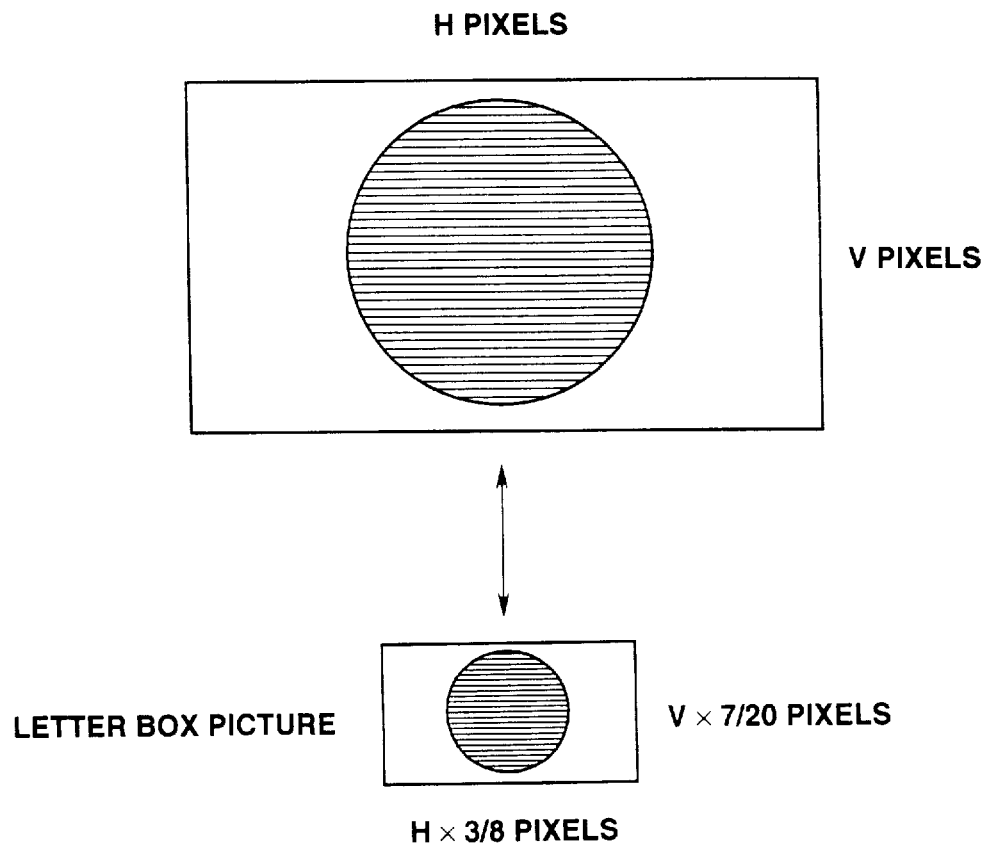
FIG. 16 is a view for explaining an example of a fourth processing in the down-sampling circuit 301 of FIG. 1.

FIG. 16 shows a still more further embodiment. In this embodiment, higher resolution picture of H pixels in lateral direction and V pixels in longitudinal direction is converted into lower resolution picture of H×⅜ pixels in lateral direction and V×⁷⁄₂₀ pixels in longitudinal direction. This lower resolution picture is caused to be picture of format of the letter box system.

Down-sampling of ⅜ times in lateral direction can be realized in accordance with the principle shown in FIG. 6.

Figure 17:
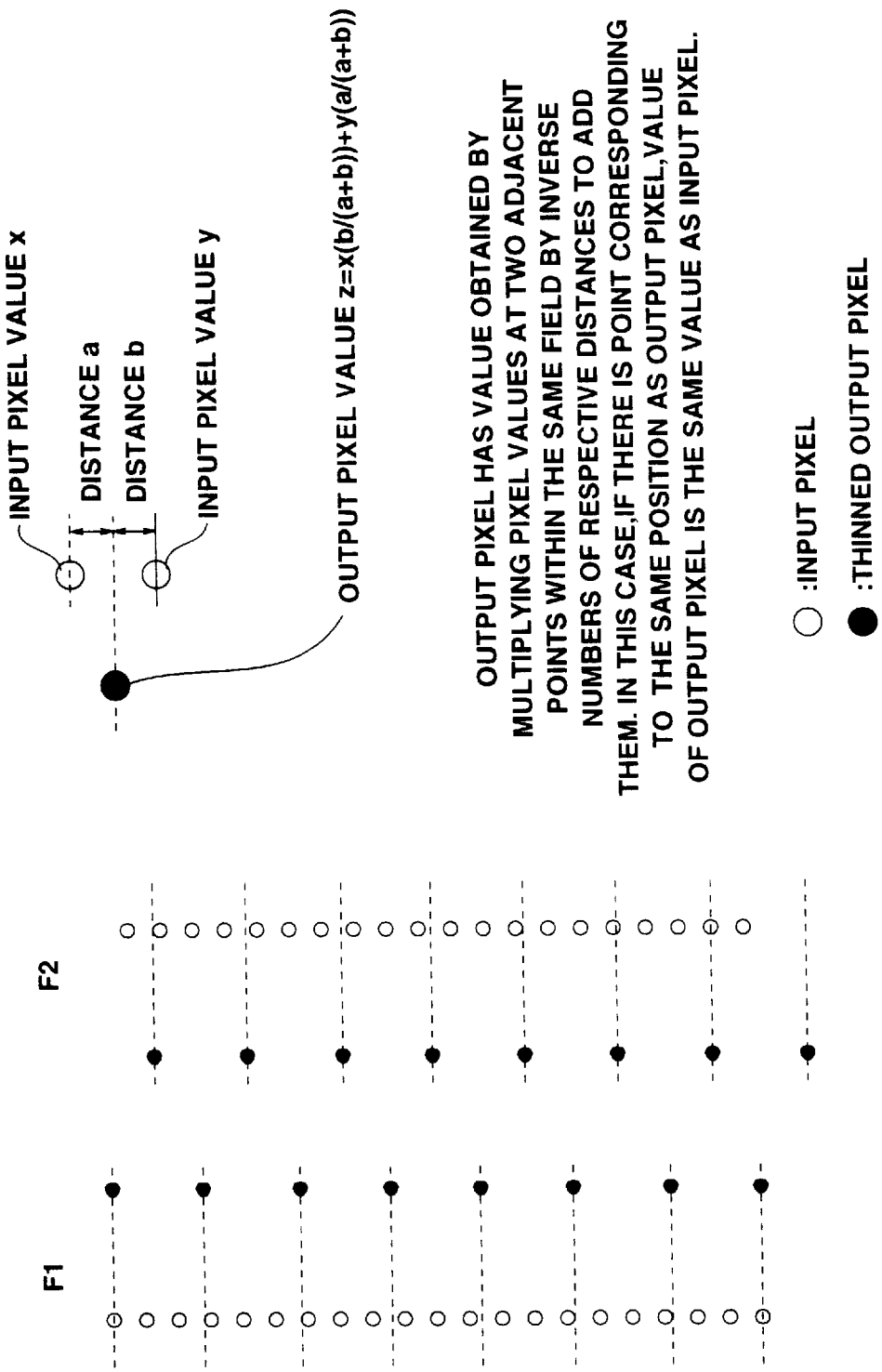
FIG. 17 is a view for explaining down-sampling in longitudinal direction of the embodiment of FIG. 16.

Down-sampling of ⁷⁄₂₀ times in longitudinal direction can be realized in accordance with the principle shown in FIG. 17, for example. Also in this case, output pixel z can be obtained by calculating the following formula in correspondence with distances a and b with respect to input pixels x and y.

$$z=x(b/(a+b))+y(a/(a+b))$$

By this calculation, in the first and second fields F1 and F2, it is sufficient to generate data of seven lines from 20 lines, respectively.

Up-sampling of ⅜ times in lateral direction can be realized in accordance with the principle shown in FIG. 8.

Figure 18:
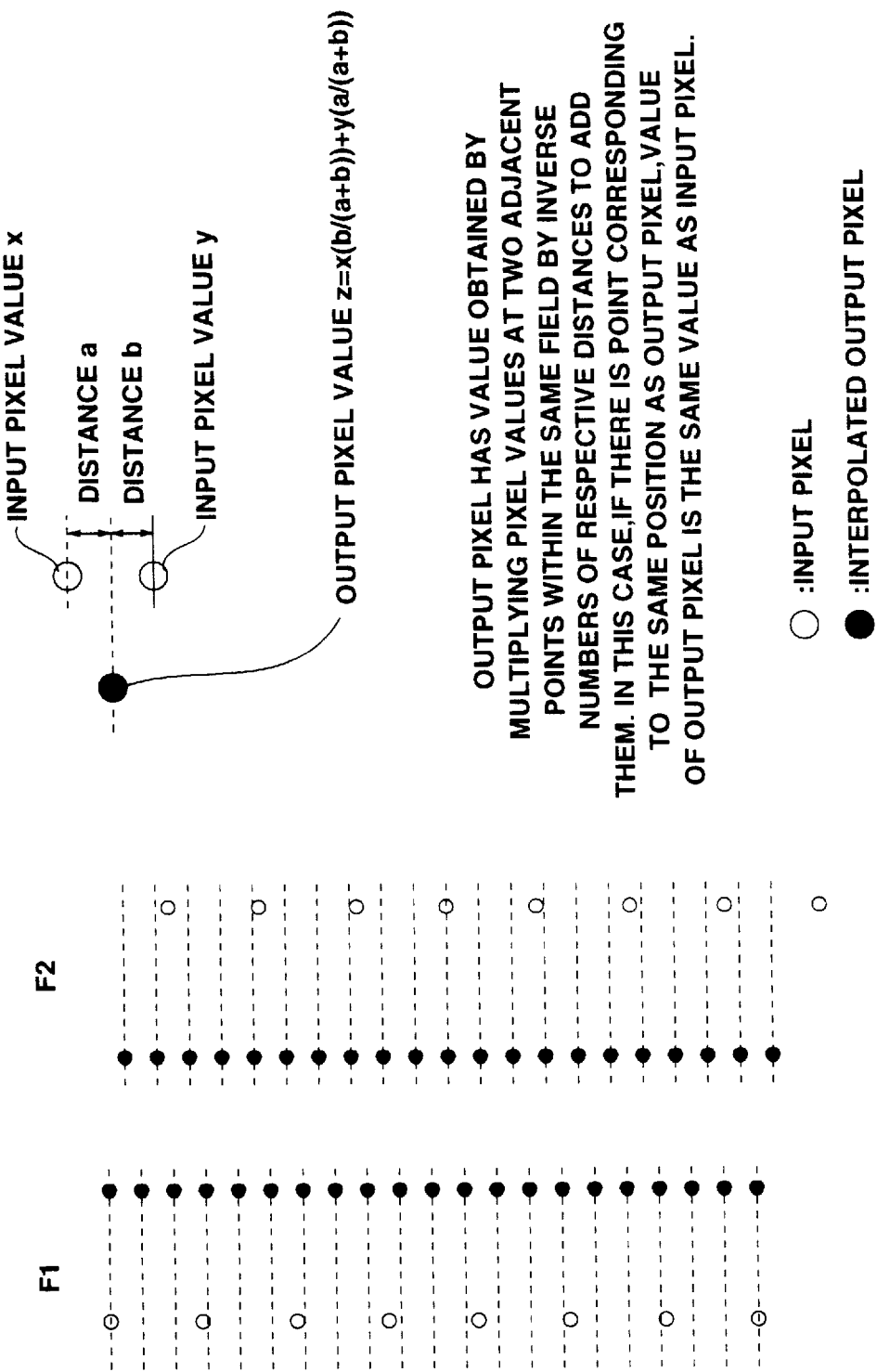
FIG. 18 is a view for explaining up-sampling corresponding to the down-sampling of FIG. 17.

Up-sampling of ²⁰⁄₇ times in longitudinal direction can be realized in accordance with the principle shown in FIG. 18, for example. Also in this case, in the first and second fields F1 and F2, calculation by the following formula is carried out in correspondence with distances a and b with respect to input pixels x and y, thus making it possible to obtain output pixel z.

$$z=x(b/(a+b))+y(a/(a+b))$$

In this way, in respective fields, data of 20 lines are generated from data of seven lines.

Embodiment shown in FIG. 16 can be applied to the case where higher resolution picture of 1920 pixels in lateral direction and 1024 pixels in longitudinal direction is converted into lower resolution picture of 720 pixels in lateral direction and 358 pixels in longitudinal direction. When down-sampling of ⁷⁄₂₀ times in longitudinal direction is implemented to 1024 pixels in longitudinal direction, the number of pixels obtained is greater than 358 pixels in longitudinal direction. For this reason, in this case, processing for deleting lines at the upper or lower end portion of picture, etc. is carried out.

When an attempt is made to carry out down-sampling of ⁷⁄₂₀ times in longitudinal direction shown in FIG. 16, the number of coefficients for weighting is increased, so the circuit configuration for calculation processing becomes complicated. In view of this, for example, down-sampling of ⅓ times may be employed in place of the down-sampling of ⁷⁄₂₀ times. Down-sampling in lateral direction in this case has a ratio of ⅜ times. This ratio is the same as that in the case shown in FIG. 16.

Figure 19:
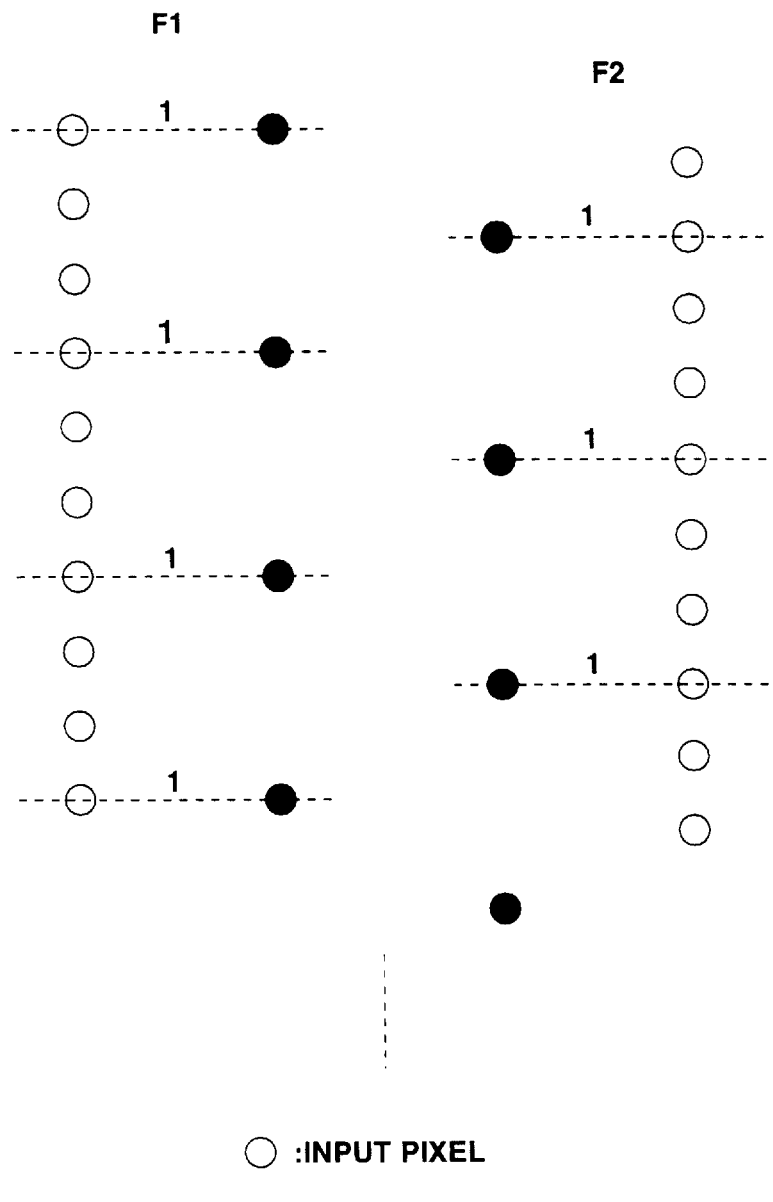
FIG. 19 is a view for explaining another example of processing of down-sampling in longitudinal direction of the embodiment of FIG. 16.

FIG. 19 shows the principle of down-sampling of ⅓ times. As shown in this figure, in the first and second fields F1 and F2, one lines are thinned (extracted) from respective three lines, thereby making it possible to carry out down-sampling in longitudinal direction of ⅓ times.

Figure 20:
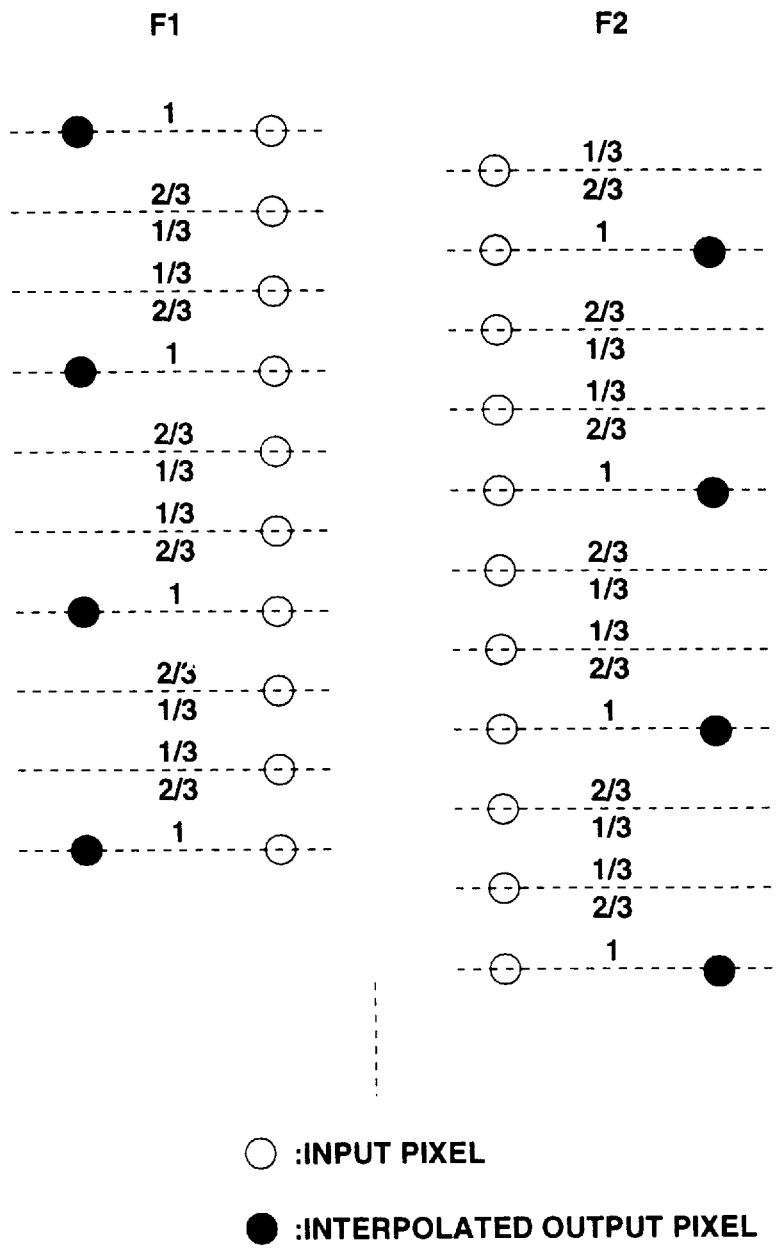
FIG. 20 is a view for explaining up-sampling corresponding to the down-sampling of FIG. 19.

In this case, it is necessary to allow up-sampling in longitudinal direction to have a ratio of three times. This can be realized in accordance with the principle shown in FIG. 20, for example. Namely, also in this case, input pixels are multiplied by predetermined coefficients to implement weighting thereto to thereby generate data of three lines from data of respective one lines in the fields F1, F2.

As stated above, down-sampling of ⁷⁄₂₀ times and up-sampling of ²⁰⁄₇ times are respectively approximated by down-sampling of ⅓ times and up-sampling of 3 times, thereby simplifying the configuration. Thus, low cost apparatus can be realized.

This embodiment can be applied to the case where higher resolution picture of 1920 pixels in lateral direction and 1024 pixels in longitudinal direction is converted into lower resolution picture of 720 pixels in lateral direction and 341 pixels in longitudinal direction. When down-sampling in longitudinal direction is implemented to 1024 pixels in longitudinal direction, the number of pixels obtained is greater than 341 pixels in longitudinal direction. For this reason, in this case, processing for deleting lines at the upper or lower end portion of picture is carried out.

In a manner stated above, it is possible to respectively encode picture of higher resolution and picture of lower resolution to transmit coded picture data to decode them. In the case where, e.g., optical disc is used as transmission media, picture of higher resolution and picture of lower resolution are recorded onto optical disc.

Figure 21:
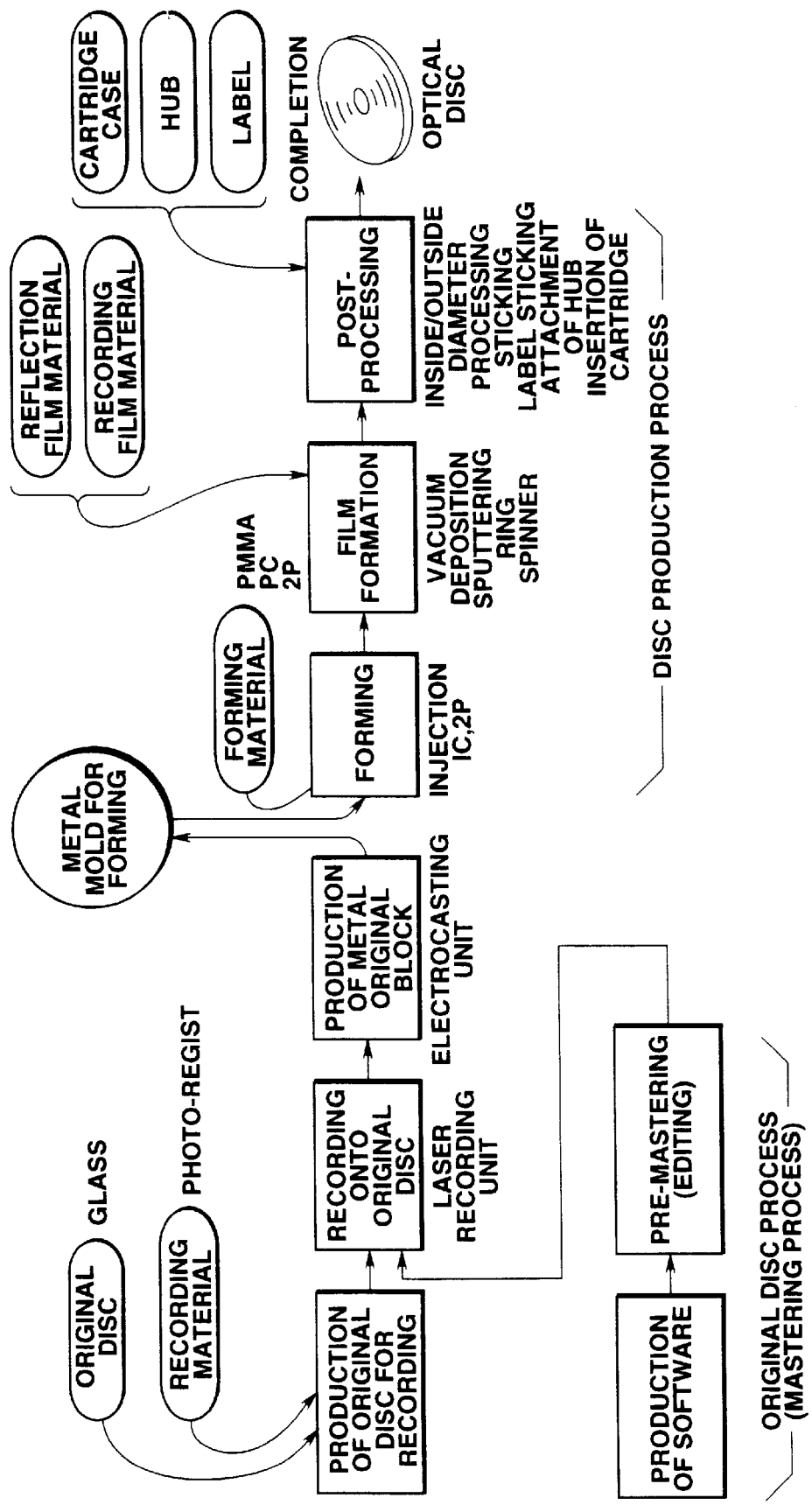
FIG. 21 is a view for explaining a method of manufacturing a disc on which data coded by picture signal coding method according to this invention is recorded.
Figures 22A, 22B:
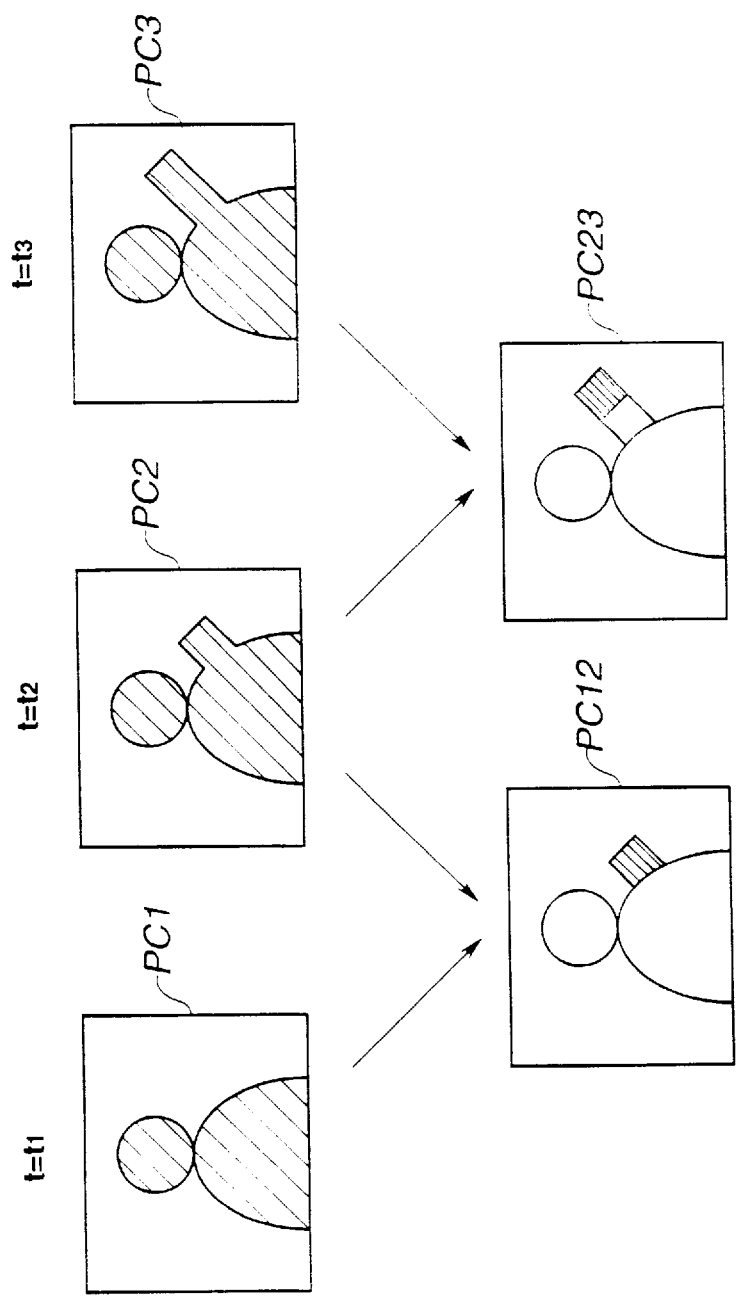
FIG. 22 is a view for explaining the principle of efficient coding.
Figure 23A:
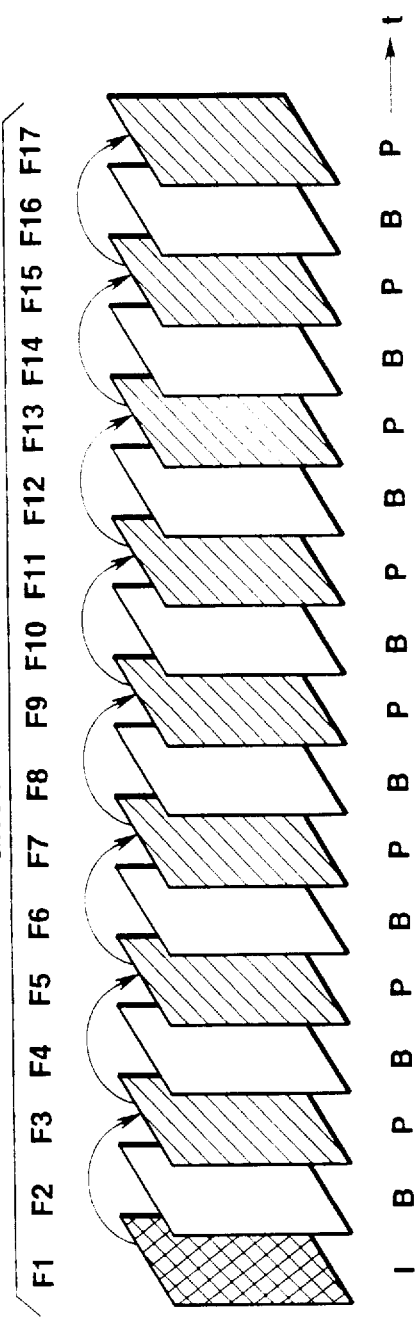
FIG. 23 is a view for explaining picture type for encoding picture.
Figure 23B:
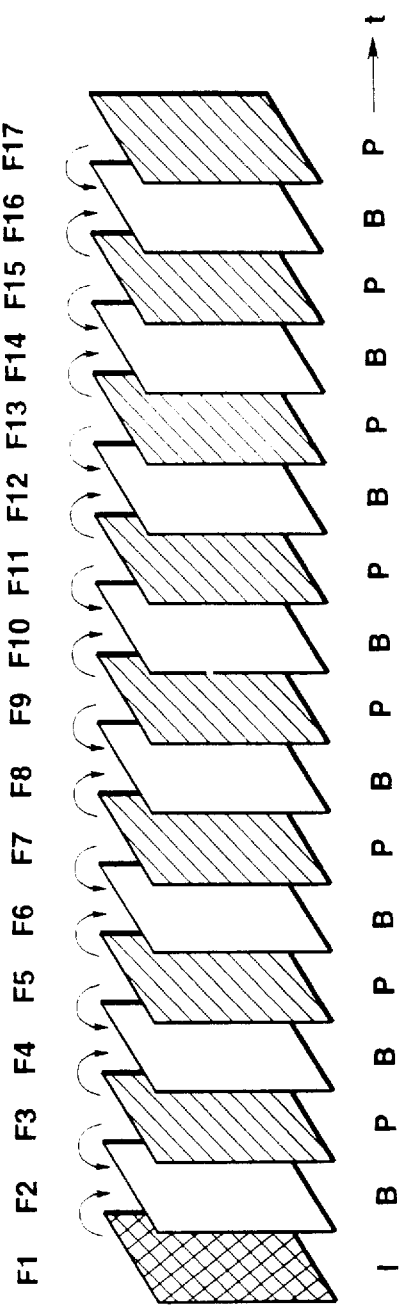
Figure 24A:
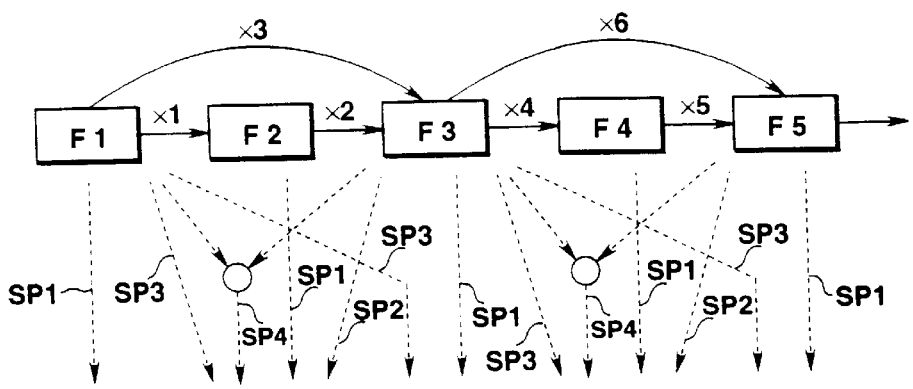
FIG. 24 is a view for explaining the principle for encoding successive moving picture signals.
Figure 24B:
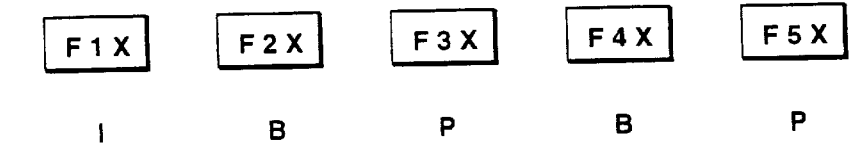

FIG. 21 shows a method of manufacturing such a disc. Namely, original disc (block) comprised of, e.g., glass is prepared to coat recording material comprised of, e.g., photo-resist, etc. thereon. Thus, recording original disc (block) is made up. On the other hand, in a manner as described above, bit stream including picture data of higher resolution and picture data of lower resolution is once recorded onto, e.g., magnetic tape, etc. in accordance with a predetermined format, thus to make up software.

Such software is edited as occasion demands to generate a signal of format to be recorded onto optical disc. Laser beams are modulated in correspondence with this recording signal to irradiate those laser beams onto photo-resist on the original disc (block). Thus, photo-resist on the original disc (block) is exposed to light in correspondence with recording signal.

Thereafter, this original disc is caused to undergo development processing to allow pits to appear on the original disc. Processing, e.g., electrocasting, etc. is implemented to the original disc prepared in this way to make up metallic original disc to which pits on the glass original disc are transferred. Metallic stamper is further made up from the metal original disc to use it as metal mold for forming.

Material such as PMMA (acrylic substance) or PC (polycarbonate), etc. is injected into the metal mold for forming by using, e.g., injection, etc. to solidify it. Alternatively, 2P (ultraviolet hardening resin), etc. is coated onto metallic stamper thereafter to irradiate ultraviolet rays thereonto to harden it. Thus, it is possible to transfer pits on the metallic stamper onto replica comprised of resin.

Reflection film is formed by vacuum-deposition or sputtering, etc. on the replica produced in this way. Alternatively, such reflection film is formed by spin-coat.

Thereafter, processing of inside and outside diameters is implemented to this disc to carry out a necessary processing to stick two discs together, etc. In addition, label is stuck on disc and hub is attached thereto. The disc thus obtained is inserted into cartridge. Optical disc is completed in this way.

Industrial Applicability

As stated above, in accordance with the picture signal coding method and picture signal coding apparatus, and picture signal decoding method and picture signal decoding apparatus of this invention, picture signal of higher resolution is coded in a manner caused to have different aspect ratio and is transmitted. The signal thus obtained is decoded. Accordingly, it is possible to monitor, e.g., picture signal of higher resolution of the high vision system by, e.g., image receiver of lower resolution of the NTSC system. It is a matter of course that some image receivers of the high vision system permit pictures of high resolution to be observed as they are.

Further, in image receiver having low resolution but such that its aspect ratio is set to, e.g., ratio of 16:9, if that image receiver has a function to allow picture of the squeeze system of aspect ratio of 4:3 to be picture of the original aspect ratio of 16:9 for a second time, it is possible to observe picture of normal ratio.

Furthermore, in the case where picture of lower resolution is transmitted as picture of the letter box system, also in image receiver of the NTSC system having aspect ratio of 4:3, it is possible to observe such a picture as picture of correct ratio between length and breadth. In addition, in image receiver of the NTSC system having aspect ratio of 16:9, it is possible to display picture in an extended manner over the entirety of screen without inserting lines of substantially non-picture at the upper and lower portions of picture.

What is claimed is:

1. A picture signal coding method, comprising the steps of:

down-sampling an input picture signal of higher resolution, formed of pixels arrayed in longitudinal and lateral directions, at a first ratio in the longitudinal direction and a second ratio different from said first ratio in the lateral direction to generate a picture signal of lower resolution having an aspect ratio different from the aspect ratio of the input picture signal of higher resolution;

predictive-coding the picture signal of lower resolution to provide a first coded picture signal;

decoding said first coded picture signal;

up-sampling the decoded first coded picture signal at an inverse of the down-sampling ratios to generate an up-sampled picture signal of higher resolution having an aspect ratio different from the aspect ratio of the decoded first coded picture signal;

weighting said up-sampled picture signal according to a weighting factor to generate a weighted up-sampled picture signal; and predictive-coding said input picture signal of higher resolution by using the generated weighted up-sampled picture signal to provide a second coded picture signal.

2. A picture signal coding method as set forth in claim 1, wherein the picture signal of higher resolution has 1920 pixels in the lateral direction and 960 pixels in the longitudinal direction, and wherein the picture signal of lower resolution has 720 pixels in the lateral direction and 480 pixels in the longitudinal direction.

3. A picture signal coding method as set forth in claim 1, wherein the picture signal of higher resolution has 1920 pixels in the lateral direction and 1152 pixels in the longitudinal direction, and wherein the picture signal of lower resolution has 720 pixels in the lateral direction and 576 pixels in the longitudinal direction.

4. A picture signal coding method as set forth in claim 1, wherein the picture signal of higher resolution has 1920 pixels in the lateral direction and 1024 pixels in the longitudinal direction, and wherein the picture signal of lower resolution has 720 pixels in the lateral direction and 483 pixels in the longitudinal direction.

5. A picture signal coding method as set forth in claim 1, wherein the picture signal of higher resolution has 1920 pixels in the lateral direction and 1024 pixels in the longitudinal direction, and wherein the picture signal of lower resolution has 720 pixels in the lateral direction and 358 pixels in the longitudinal direction.

6. A picture signal coding method as set forth in claim 1, wherein the picture signal of higher resolution has 1920 pixels in the lateral direction and 1024 pixels in the longitudinal direction, and wherein the picture signal of lower resolution has 720 pixels in the lateral direction and 341 pixels in the longitudinal direction.

7. A picture signal coding method as set forth in claim 1, wherein the generated picture signal of lower resolution exhibits ½ the number of pixels in the longitudinal direction and ⅜ the number of pixels in the lateral direction as compared to the input picture signal of higher resolution, and wherein the up-sampled picture signal of higher resolution exhibits a resolution of twice the number of pixels in the longitudinal direction and ⅝ the number of pixels in the lateral direction as compared to the decoded first coded picture signal.

8. A picture signal coding method as set forth in claim 1, wherein the generated picture signal of lower resolution exhibits 7/15 the number of pixels in the longitudinal direction and ⅜ the number of pixels in the lateral direction as compared to the input picture signal of higher resolution, and wherein the up-sampled picture signal of higher resolution exhibits a resolution of 15/7 the number of pixels in the longitudinal direction and 8/3 the number of pixels in the lateral direction compared to the decoded first coded picture signal.

9. A generated picture signal coding method as set forth in claim 1, wherein the of lower picture signal resolution exhibits 7/20 the number of pixels in the longitudinal direction and 3/8 the number of pixels in the lateral direction as compared to the input picture signal of higher resolution, and wherein the up-sampled picture signal of higher resolution exhibits a resolution of 20/7 the number of pixels in the longitudinal direction and 8/3 the number of pixels in the lateral direction as compared to the decoded first coded picture signal.

10. A picture signal coding method as set forth in claim 1, wherein the generated picture signal of lower resolution exhibits 1/3 the number of pixels in the longitudinal direction and 3/8 the number of pixels in the lateral direction as compared to the input picture signal of higher resolution, and wherein the up-sampled picture signal of higher resolution exhibits a resolution 3 times the number of pixels in the longitudinal direction and 8/3 the number of pixels in the lateral direction as compared to the decoded first coded picture signal.

11. A picture signal coding apparatus, comprising:
 means for down-sampling an input picture signal of higher resolution, formed of pixels arrayed in longitudinal and lateral directions, at a first ratio in the longitudinal direction and a second ratio different from said first ratio in the lateral direction to generate a picture signal of lower resolution having an aspect ratio different from the aspect ratio of the input picture signal of higher resolution;
 first coding means for predictive coding the picture signal of lower resolution to provide a first coded picture signal;
 decoding means for decoding said first coded picture signal;
 means for up-sampling the decoded first coded picture signal at an inverse of the down-sampling ratio to generate an up-sampled picture signal of higher resolution having an aspect ratio different from the aspect ratio of the decoded first coded picture signal;
 means for weighting said up-sampled picture signal according to a weighting factor to generate a weighted up-sampled picture signal; and
 second coding means for predictive-coding said input picture signal of higher resolution by using the generated weighted up-sampled signal to provide a second coded picture signal.

12. A picture signal coding apparatus as set forth in claim 11,
 wherein the picture signal of higher resolution has 1920 pixels in the lateral direction and 960 pixels in the longitudinal direction, and
 wherein the picture signal of lower resolution has 720 pixels in the lateral direction and 480 pixels in the longitudinal direction.

13. A picture signal coding apparatus as set forth in claim 11,
 wherein the picture signal of higher resolution has 1920 pixels in the lateral direction and 1152 pixels in the longitudinal direction, and
 wherein the picture signal of lower resolution has 720 pixels in the lateral direction and 576 pixels in the longitudinal direction.

14. A picture signal coding apparatus as set forth in claim 1,
 wherein the picture signal of higher resolution has 1920 pixels in the lateral direction and 1024 pixels in the longitudinal direction, and
 wherein the picture signal of lower resolution has 720 pixels in the lateral direction and 483 pixels in the longitudinal direction.

15. A picture signal coding apparatus as set forth in claim 1,
 wherein the picture signal of higher resolution has 1920 pixels in the lateral direction and 1024 pixels in the longitudinal direction, and
 wherein the picture signal of lower resolution has 720 pixels in the lateral direction and 358 pixels in the longitudinal direction.

16. A picture signal coding apparatus as set forth in claim 1,
 wherein the picture signal of higher resolution has 1920 pixels in the lateral direction and 1024 pixels in the longitudinal direction, and
 wherein the picture signal of lower resolution has 720 pixels in the lateral direction and 341 pixels in the longitudinal direction.

17. A picture signal coding apparatus as set forth in claim 11, wherein the generated picture signal of lower resolution exhibits 1/2 the number of pixels in the longitudinal direction and 3/8 the number of pixels in the lateral direction as compared to the input picture signal of higher resolution, and wherein the up-sampled picture signal of higher resolution exhibits a resolution twice the number of pixels in the longitudinal direction and 8/3 the number of pixels in the lateral direction as compared to the decoded first coded picture signal.

18. A picture signal coding apparatus as set forth in claim 11, wherein the generated picture signal of lower resolution exhibits 7/15 the number of pixels in the longitudinal direction and 3/8 the number of pixels in the lateral direction as compared to the input picture signal of higher resolution, and wherein the up-sampled picture signal of higher resolution exhibits a resolution of 15/7 the number of pixels in the longitudinal direction and 8/3 the number of pixels in the lateral direction as compared to the decoded first coded picture signal.

19. A picture signal coding apparatus as set forth in claim 11, wherein the generated picture signal of lower resolution exhibits 7/20 the number of pixels in the longitudinal direction and 3/8 the number of pixels in the lateral direction as compared to the input picture signal of higher resolution, and wherein the up-sampled picture signal of higher resolution exhibits a resolution of 20/7 the number of pixels in the longitudinal direction and 8/3 the number of pixels in the lateral direction as compared to the decoded first coded picture signal.

20. A picture signal coding apparatus as set forth in claim 11, wherein the generated picture signal of lower resolution exhibits 1/3 the number of pixels in the longitudinal direction and 3/8 the number of pixels in the lateral direction as compared to the input picture signal of higher resolution, and wherein the up-sampled picture signal of higher resolution exhibits a resolution of 3 times the number of pixels in the longitudinal direction and 8/3 the number of pixels in the lateral direction as compared to the decoded first coded picture signal.

21. A picture signal decoding method, comprising the steps of:

receiving a first coded picture signal of lower resolution and a second coded picture signal of higher resolution;

predictive-decoding the first coded picture signal to provide a first decoded picture signal;

up-sampling the first decoded picture signal at a first ratio in the longitudinal direction and a second ratio different from said first ratio in the lateral direction to generate an up-sampled picture signal of higher resolution having an aspect ratio different from the aspect ratio of the first picture signal of lower resolution;

weighting said up-sampled picture signal according to a weighting factor to generate a weighted up-sampled picture signal; and predictive-decoding the second coded picture signal by using the generated weighted up-sampled picture signal to provide a second decoded picture signal.

22. A picture signal decoding method as set forth in claim 21, wherein the second decoded picture signal has 1920 pixels in the lateral direction and 960 pixels in the longitudinal direction, and wherein the first decoded picture signal has 720 pixels in the lateral direction and 480 pixels in the longitudinal direction.

23. A picture signal decoding method as set forth in claim 21, wherein the second decoded picture signal has 1920 pixels in the lateral direction and 1152 pixels in the longitudinal direction, and wherein the first decoded picture signal has 720 pixels in the lateral direction and 576 pixels in the longitudinal direction.

24. A picture signal decoding method as set forth in claim 21, wherein the second decoded picture signal has 1920 pixels in the lateral direction and 1024 pixels in the longitudinal direction, and wherein the first decoded picture signal has 720 pixels in the lateral direction and 483 pixels in the longitudinal direction.

25. A picture signal decoding method as set forth in claim 21, wherein the second decoded picture signal has 1920 pixels in the lateral direction and 1024 pixels in the longitudinal direction, and wherein the first decoded picture signal has 720 pixels in the lateral direction and 358 pixels in the longitudinal direction.

26. A picture signal decoding method as set forth in claim 21, wherein the second decoded picture signal has 1920 pixels in the lateral direction and 1024 pixels in the longitudinal direction, and wherein the first decoded picture signal has 720 pixels in the lateral direction and 341 pixels in the longitudinal direction.

27. A picture signal decoding method as set forth in claim 21, wherein the generated up-sampled picture signal exhibits twice the resolution in the longitudinal direction and $8/3$ the resolution in the lateral direction as compared to the first decoded picture signal.

28. A picture signal decoding method as set forth in claim 21, wherein the generated up-sampled picture signal exhibits $15/7$ the resolution in the longitudinal direction and $8/3$ the resolution in the lateral direction as compared to the first decoded picture signal.

29. A picture signal decoding method as set forth in claim 21, wherein the generated up-sampled picture signal exhibits $20/7$ the resolution in the longitudinal direction and $8/3$ the resolution in the lateral direction as compared to the first decoded picture signal.

30. A picture signal decoding method as set forth in claim 21, wherein the generated up-sampled picture signal exhibits three times the resolution in the longitudinal direction and $8/3$ the resolution in the lateral direction as compared to the first decoded picture signal.

31. A picture signal decoding apparatus, comprising:

means for receiving a first coded picture signal of lower resolution and a second coded picture signal of higher resolution;

first decoding means for predictive-decoding the first coded picture signal to provide a first decoded picture signal;

means for up-sampling the first decoded picture signal at a first ratio in the longitudinal direction and a second ratio different from said first ratio in the lateral direction to generate an up-sampled picture signal of higher resolution having an aspect ratio different from the aspect ratio of the first picture signal of lower resolution;

means for weighting said up-sampled picture signal according to a weighting factor to generate a weighted up-sampled picture signal; and second decoding means for predictive-decoding the second coded picture signal by using the generated weighted up-sampled picture signal to provide a second decoded picture signal.

32. A picture signal decoding apparatus as set forth in claim 31, wherein the second decoded picture signal has 1920 pixels in the lateral direction and 960 pixels in the longitudinal direction, and wherein the first decoded picture signal has 720 pixels in the lateral direction and 480 pixels in the longitudinal direction.

33. A picture signal decoding apparatus as set forth in claim 31, wherein the second decoded picture signal has 1920 pixels in the lateral direction and 1152 pixels in the longitudinal direction, and wherein the first decoded picture signal has 720 pixels in the lateral direction and 576 pixels in the longitudinal direction.

34. A picture signal decoding apparatus as set forth in claim 31, wherein the second decoded picture signal has 1920 pixels in the lateral direction and 1024 pixels in the longitudinal direction, and wherein the first decoded picture signal has 720 pixels in the lateral direction and 483 pixels in the longitudinal direction.

35. A picture signal decoding apparatus as set forth in claim 31, wherein the second decoded picture signal has 1920 pixels in the lateral direction and 1024 pixels in the longitudinal direction, and wherein the first decoded picture signal has 720 pixels in the lateral direction and 358 pixels in the longitudinal direction.

36. A picture signal decoding apparatus as set forth in claim 31, wherein the second decoded picture signal has 1920 pixels in the lateral direction and 1024 pixels in the longitudinal direction, and wherein the first decoded picture signal has 720 pixels in the lateral direction and 341 pixels in the longitudinal direction.

37. A picture signal decoding apparatus as set forth in claim 31, wherein the generated up-sampled picture signal exhibits twice the resolution in the longitudinal direction and $8/3$ the resolution in the lateral direction as compared to the first decoded picture signal.

38. A picture signal decoding apparatus as set forth in claim 31, wherein the generated up-sampled picture signal exhibits $15/7$ the resolution in the longitudinal direction and $8/3$ the resolution in the lateral direction as compared to the first decoded picture signal.

39. A picture signal decoding apparatus as set forth in claim 31, wherein the generated up-sampled picture signal exhibits $20/7$ the resolution in the longitudinal direction and $8/3$ the resolution in the lateral direction as compared to the first decoded picture signal.

40. A picture signal decoding apparatus as set forth in claim 31, wherein the generated up-sampled picture signal exhibits three times the resolution in the longitudinal direction and $8/3$ the resolution in the lateral direction as compared to the first decoded picture signal.

* * * * *